(12) United States Patent
Fougner

(10) Patent No.: US 10,540,437 B2
(45) Date of Patent: Jan. 21, 2020

(54) SYSTEM AND INTERFACE FOR ELECTRONIC COMMUNICATION GENERATION AND TRACKING

(71) Applicant: Jon Fougner, San Francisco, CA (US)

(72) Inventor: Jon Fougner, San Francisco, CA (US)

(73) Assignee: Jon Fougner, San Francisco, CA (US)

( * ) Notice: Subject to any disclaimer, the term of this patent is extended or adjusted under 35 U.S.C. 154(b) by 871 days.

(21) Appl. No.: 15/137,975

(22) Filed: Apr. 25, 2016

(65) Prior Publication Data
US 2016/0314111 A1    Oct. 27, 2016

Related U.S. Application Data

(60) Provisional application No. 62/152,099, filed on Apr. 24, 2015.

(51) Int. Cl.
*G06Q 30/00*  (2012.01)
*G06Q 50/18*  (2012.01)
(Continued)

(52) U.S. Cl.
CPC .......... *G06F 17/248* (2013.01); *G06F 3/0482* (2013.01); *G06Q 30/016* (2013.01);
(Continued)

(58) Field of Classification Search
None
See application file for complete search history.

(56) References Cited

U.S. PATENT DOCUMENTS 6,370,542 B1 * 4/2002 Kenyon ................. G06Q 10/10
                                                         707/603
6,694,315 B1 * 2/2004 Grow .................... G06Q 10/109
(Continued)

OTHER PUBLICATIONS

JAMS Guide to Dispute Resolution for Commercial Contracts, [Online]. Retrieved from _the Internet:<:http://www.jamsadr.com/rules/clauses.asp, (Revised Aug. 2006), 3 pgs (Year: 2006).*
(Continued)

*Primary Examiner* — Stephanie Z Delich
(74) *Attorney, Agent, or Firm* — Wolf, Greenfield & Sacks, P.C.

(57) ABSTRACT

Various systems and methods are disclosed for enabling a consumer's creation of a communication (e.g., letter, e-mail) addressed to a provider of goods and/or services. Manually and/or automatically by providing access to one or more existing data repositories, the user completes a software-presented questionnaire, and responses are used by the system to customize and populate a templated form. The form identifies, elaborates and, in some cases, quantifies problems with the provider's performance. The system focuses on form letters by consumers to businesses, thereby increasing its depth while avoiding unnecessary complexity. Some embodiments also (at the user's instruction) submit portions of the communication to third parties (e.g., regulatory agencies), track delivery of the communication, and provide background information relating consumer communications with businesses. Some embodiments are tailored to requirements of providers for selected correspondence (e.g., a "notice of dispute" telecommunications providers purport to require before allowing contractual right to arbitration).

20 Claims, 19 Drawing Sheets

(51) Int. Cl.
*G06F 17/24* (2006.01)
*H04L 12/58* (2006.01)
*G06F 3/0482* (2013.01)

(52) U.S. Cl.
CPC ......... *G06Q 50/182* (2013.01); *H04L 51/046* (2013.01); *G06F 2203/04803* (2013.01)

(56) References Cited

U.S. PATENT DOCUMENTS

| | | | | |
|---|---|---|---|---|
| 7,035,830 | B1* | 4/2006 | Shaikh | G06Q 10/10 |
| 10,181,167 | B2* | 1/2019 | Eidelman | G06N 5/022 |
| 2002/0147604 | A1* | 10/2002 | Slate, II | G06Q 10/10 705/64 |
| 2004/0153875 | A1* | 8/2004 | Amyot | H04M 3/42153 714/47.3 |
| 2006/0031177 | A1* | 2/2006 | Rule | G06Q 10/10 705/309 |
| 2011/0047007 | A1* | 2/2011 | Rule | G06Q 10/107 705/7.39 |
| 2012/0016943 | A1* | 1/2012 | Greenberg | G06Q 10/06 709/206 |
| 2014/0006292 | A1* | 1/2014 | Kozlovsky | G06Q 30/016 705/304 |
| 2014/0376519 | A1* | 12/2014 | Yang | H04W 74/0816 370/336 |

OTHER PUBLICATIONS

Rule, Colin, "Online Dispute Resolution for Business—B2B, E-Commerce, Consumer, Employment, Insurance, and Other Commercial Conflicts", Online Dispute Resolution for Business. Jossev-Bass. A Wiley Imprint. (2002), 1-326 (Year: 2002).*

Alan Wiener, "Opportunity and Initiatives in Online Dispute Resolution," SPIDR News, Society of Professionals in Dipute Resolution, vol. 24, No. 3, Summer 2000. (Year: 2000).*

V. W. Mitchell, "Handling Consumer Complaint Information: Why and How?" Logistics Information Management, vol. 6, No. 3 1993, pp. 20-26. (Year: 1993).*

* cited by examiner

FIG. 5

Example left-hand side variables observed and predicted by the system

Whether provider makes offer in response to NOD*
Size of provider's offer*
Acceptance of provider's offer by consumer*
Customer satisfaction rating and functions thereof (e.g., Net Promoter Score)*

= f(

Example right-hand side variables observed and influenced by the system

Service provider*
Departments available, and variants thereof*
Departments selected*
Problems available, and variants thereof*
Problems selected*
Variants of legal background essays*
Dollar amount of refund requested*
State of residence*
Whether user is representing the account holder*
Whether submitting to regulator(s)*
Regulator(s)*
Auto-selected and hand-coded features of free text narrative*
NOD delivery mechanism*
Variants of template substance and style*

)

* indicates variables that have not previously been susceptible to systematic tracking and statistical analysis at scale by consumers

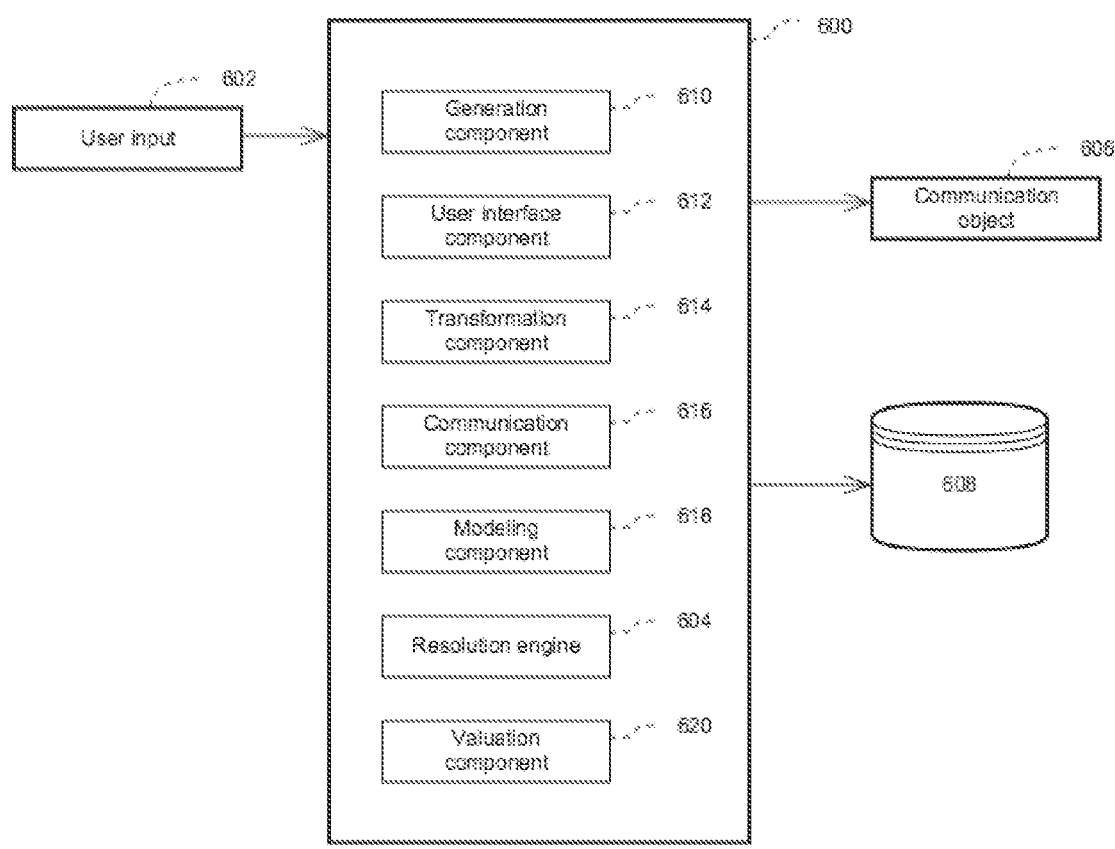

FIG. 7

```
{
capture ()
        if true <parse text = notnull> DO:              //parse text capture:
                                                       //user input
                match <parsetext> on <business>;       //match on business
                match <parsetext> on <category>;       //match on category
                match <parsetext> on <problem>;        //match on dispute facts
                assign <template>;                     //determine template match
                next <parse text>;                     //continue through input until done
assign ()
        if <template = notnull> use match input;       // use match input to pre-fill
        elseif display <category> drop down;
                select <business> with <category>;
                display <business> drop down;
                select <problem> with <business>;
                display <problem> drop down;           //build problem "profile"
                select <template> with <profile>;      //can be >1
fill ()
        if template fields null                        //any empty fields
                display <question> associated w/ template field;
                filter source to eliminate questions;  //remove questions or template
                next field;
        else generate ();
generate ()                                            //build communication object
        merge <field> with question <response>;
        testfail: if true translate <response>;        //if merge fails or invalid input for template
                                                       //field – translate field to valid form
        next<field>;
        validate<requirements> if true end else fill ();
model ()
        regression of outcome on                       // build regression models
                <input facts>                          //
                <business>
                <problem category>
                <problem>
                <value calc>
                <template>
                <template objects>
                <user>
        store <regression output> in each match;       //models on any one or any combination of
                                                       // category, business, problem, val calc,
                                                       // template, template object, user
                store all matches in run as profile object;
}
```

FIG. 10A
1000

What kinds of issues are you having with your provider?
Select all that apply.

Common phone problems — 1010
1036    1018
Faulty coverage
Verizon falsely stated my address would have good coverage.
See more   — 1038

Common TV / internet problems — 1012

Slow internet — 1020
New York's attorney general asks you to test your speed at http://internethealthtest.org/nyc.

Faulty TV — 1022
My "HD" TV signal is pixelated, fuzzy, or not working at all.

See more

Common billing problems — 1014

☐ Bait-and-switch  — 1024
My monthly bill is higher than Verizon promised.

☐ Fake discount on smartphone — 1026
My "discounted" phone was full-price, spread out monthly.

☐ Hidden fee — 1028
Verizon charged me a hidden fee.

☐ Billed after cancellation — 1030
Verizon kept billing me as if I hadn't cancelled.

See more

— 1008

🎧 Common customer support problems — 1016

☐ Broke service appointment — 1032
No technician came when Verizon promised one would.

☐ Hours on phone — 1034
Verizon keeps me waiting for hours, transferring my call like a "hot potato."

See more

What kinds of issues are you having with your provider?
Select all that apply.

Common phone problems

Faulty coverage
Verizon falsely stated my address would have good coverage.

See more

Broken
What Verizon sold me doesn't work.

Not delivered
Verizon's device never arrived.

Faulty software
Verizon forced faulty firmware updates.

Faulty landline service
My landline service malfunctions or doesn't work at all.

Common TV / internet problems (cont'd)

FIG. 11C

☐ Bait-and-switch ⟵ 1024
   My monthly bill is higher than Verizon promised.

☐ Fake discount on smartphone ⟵ 1026
   My "discounted" phone was full price, spread out monthly.

☐ Hidden fee ⟵ 1028
   Verizon charged me a hidden fee.

☐ Billed after cancellation ⟵ 1030
   Verizon kept billing me as if I hadn't cancelled.

 See more

☐ Missing refund
   Verizon broke its promise of a gift card or refund.

☐ Bogus equipment charge
   Verizon billed me as if I hadn't returned its equipment.

🎧 Common customer support problems ⟵ 1016

☐ Broke service appointment ⟵ 1032
   No technician came when Verizon promised one would.

☐ Hours on phone ⟵ 1034
   Verizon keeps me waiting for hours, transferring my call like a "hot potato."

(cont'd)

☐ Misleading information
The information Verizon's rep told me was misleading.

☐ Hang-ups
Reps hang up for no reason.

☐ No call-backs
Verizon breaks its promises to call me.

☐ Poor English
I can't understand what Verizon's reps say.

Get started with your refund request by estimating the amounts below.

Phone — Faulty coverage

I've paid $ [____] per month for [____] months of coverage, but the coverage is only roughly [Select one] % as good as Verizon promised.

TV / Internet — Slow internet

Verizon has only delivered about [Select one] % of the speed it promised, while charging me the full $ [____] per month for [____] months.

Billing — Hidden fee

Verizon charged me a hidden $ [____] fee for [Select one].

```
//
// Event listener for UI actions
//

{
event listener( );
        while true do {
        e= getNextEvent ( );
        process event e;
} while (e != quit);

...

event select check_box
                set current = check_box.name ;    // capture identifier of selected checkbox
                set state.object(i) = current ;              // build array or other data structure to
hold
                                                  // current selections in UI event select display_object ;             // select "show more"
                set disp_category = display_object.category
                select from problem_list wherein category = display_category;
                for a = 1 to (n)                  // n max number of problems
                        // test prob_freq > threshold    // listener can implement or be
                                                  // passed pre-filtered problem lists
                        display problem ;
                        a++
                                                  // once complete full list of problems
                                                  // shown
                                                  // can also capture all problems then
                                                  // render
...

on submit do
                com_state.object                  // communication problem selection
                                                  // state to server – dynamically select
                                                  // templates for display at server -
                read comm_template.object         // server return templates
                        display frame_object      // build frame for each template
                        next object               //
                                                  // other listeners can handle next
                                                  // screen and object display frames
                                                  //

```
// implementation get provider - get the services and provider - define problems/services
// UI generates demand total from input and finalized demand object & convert into letter/email
provider = get_provider()
services = get_services(provider)
problems = get_problems(services)
demand_terms = get_final_demand_terms()
demand = create_demand(demand_terms, problems)
turn_demand_into_letter(demand)

def get_provider:              //check to see what provider the user works with
       is_user_att:
          return att
       is_user_verizon:
          return verizon
       is_user_comcast
          return comcast
       is_user_time_warner
          return time_warner def get_services(provider):    // for each service the user could use check to see if the provider
       services = []               // offers it and the user users it
       if provider.offeres_cell and user_has_cell_phone:
          services.append("cell phone")
       if provider.offers_internet and user_has_internet:
          services.append("internet")
       if provider.offers_tv and user_has_tv:
          services.append("tv")
       return services def get_problems(services):    //because problems are specific to services,
       problems = []               // loop through the services and check the problems for each one
       for service in services:
          for problem in services.problems:
             if user_has_problem(problem):
                problems.append(problem)
       return problems def get_final_demand_terms(problems):     // get any extra terms from the user
       return get_user_extra_terms()

def create_demand(terms, problems, provider, services)    // finalize the demand
       demand = combine_terms_problems_provider_services
       return demand def turn_demand_into_letter(demand)       // render the demand into a template
       template = nget_custom_template_for_provider_and_services(demand)
       render_demand_through_template(templante, demand)
```

*FIG. 15*

… # SYSTEM AND INTERFACE FOR ELECTRONIC COMMUNICATION GENERATION AND TRACKING

RELATED APPLICATIONS

This application claims priority under 35 U.S.C. § 119(e) to U.S. Provisional Application Ser. No. 62/152,099 entitled "SYSTEM AND METHODS FOR AUTOMATED PROBLEM RESOLUTION," filed on Apr. 24, 2015, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

It is inevitable that consumers and businesses break promises to each other. When it is the consumer who breaks a promise, the business—a repeat player with economies of scale—may hire a collection agency or law firm (also repeat players with economies of scale) to hound the consumer. When it is the business that breaks a promise, the consumer may hire a lawyer, if the promise is sufficiently valuable to justify the cost of the lawyer. Affordability of legal services is a global and national problem, limiting consumers' ability to effectively resolve disputes. Thus, for instance, only approximately 1 in 4,000,000 AT&T customers takes it to arbitration—even though their customer agreement bars them from going to court instead.

Lacking legal representation, the consumer may proceed pro se. However, consumers are not prepared to interpret agreements, which are heavily slanted in favor of businesses that drafted them. The result is that, as a practical matter, consumers have often lack a means to insist that everyday promises be kept. For example, telecommunications consumers face steep disadvantages. While eighty-four percent of U.S. households subscribe to pay TV, sixty two percent of consumers have only one main choice of cable provider. This market power, and the high capital and regulatory barriers to entry, allows the incumbents to remain profitable despite persistently low customer satisfaction. Thus, there is a widely- and long-felt need amongst consumers to remedy the service problems they experience, for example, with telecommunications companies.

Various conventional approaches exist that attempt to resolve consumer needs for assisted dispute resolution. For example, U.S. Publication No. WO2006017496 A3 to Rule discloses a method and system for designing online alternative dispute resolution processes. In the field of government filings and litigation, U.S. Pat. No. 7,035,830 to Shaikh discloses an electronic filing system operated by a governmental agency that accepts the electronic filing of certain documents as if the filings were done in person. U.S. Pat. No. 6,694,315 to Grow discloses an online document assembly and docketing system useful for legal proceedings. Websites such as nCourt.com allow consumers (among others) to file small claims lawsuits online.

In another field, two new companies use human advocates to seek favorable resolution of individual disputes. In particular, AirHelp apparently gathers data from air travelers on their flights, finds those flights in databases of delayed and cancelled flights, compares the delay and cancellation data to statutory thresholds (especially in the E.U.) beyond which compensation is mandated, and attempts to obtain on the traveler's behalf the compensation to which she is entitled. The other company, Fixed, helps recipients of parking tickets. The ticketed driver uploads photographs of his car and the ticket to Fixed, which attempts to fight the ticket on the driver's behalf.

SUMMARY OF THE INVENTION

It is realized that the conventional approaches available to the average consumer are insufficient to meet the consumer needs. Stated broadly, various aspects of the present invention allow a consumer to draft a letter or communication addressed to a provider of goods and/or services and efficiently seek redress. In some embodiments, the consumer completes a software-presented survey, and the survey responses are used by the system to customize and populate a templated form letter detailing, for example, a dispute, a request, and generally relevant legal background information (e.g., the user's agreement, consumer protection law, etc.). According to one embodiment, a dispute management system is configured to dynamically tailor one or more user interfaces presented and information requested to a consumer's needs. Each input in the tailored interfaces can be configured to trigger additional selections and/or refinements in the information request by the system (e.g., present new user interfaces to request further user input), until further refinement or selection is unnecessary. In some examples, the dynamic selection of survey questions is executed automatically by the system and identifies specific questions and associated tailored user interfaces from a pool of possible choices to improve the efficiency and accuracy of the dispute management system.

According to one embodiment, the survey executed by the system allows the user to identify and quantify problems with the provider's performance. In one example, the system focuses on automated creation of form letters or electronic communications that can be communicated from consumers to businesses, thereby improving the consumer's analysis of issues, and further allows the targeted recitation of problems to avoid unnecessary complexity. Unlike some conventional approaches (e.g., generalized dispute resolution providers who bring offline ADR frameworks online), some embodiments are configured for the efficient and reliable production of a specifically tailored document or electronic communication (e.g., a user-personalized form letter or electronic communication sent by a consumer to a business from which she buys goods or services, describing problems with the business's performance and requesting remediation thereof). The system can be further configured to track the communication (e.g., via courier APIs or electronic message tracking).

Some embodiments of the system are also configured (for example, at the user's selection within a user interface) to submit portions of a dispute letter or electronic communications to third parties, such as regulatory agencies. In further embodiments, the system provides user interface displays for generation and submission of a complaint to a regulatory agency and tracks delivery of, for example, the letter (e.g., via first class mail, express mail, e-mail, fax, courier APIs, etc.) or an electronic communication (e.g., via read receipt execution and return tracking). In some implementations, the system is further configured to educate a consumer on dispute resolution, legal obligations implicated by consumer disputes, and/or regulatory obligations implicated by consumer disputes, and may also provide timely general background information relating to how consumers use dispute letters to businesses.

According to another embodiment, the dispute management system is configured to satisfy the requirements of some businesses for some correspondence, or other documentation of a dispute. For example, the system is configured to generate a "notice of dispute" that can be physical or can be an electronic object for communication. The system enables consumers to satisfy, for example, telecommunications providers that require a dispute notice as a condition precedent to the consumer's invoking his contractual right to arbitration. In some examples, the system can analyze a dispute to identify a provider and specific contractual prerequisites to obtain a resolution. In one example, the system can automatically obtain provider contracts, terms of use, or any other recitation of consumer obligation. The system can further extract elements from the contracts, terms of use, and/or other recitations to determine general consumer obligations and configure a dispute session to meet those general obligations as part of a managed dispute resolution. In further embodiments, the system can be configured to develop specific provider requirements through user definition and association of any such requirements to the provider in a data repository (e.g., a provider or requirements database).

In one example, the system automatically captures dispute information from a provider's website to automatically identify requirements for reporting and requesting resolution of disputes. In another example, the system includes APIs configured to capture contact information, terms of use, requirements for reporting problems, escalation channels, etc. In another the system can also automatically capture information from prior submissions. In yet other embodiments, web-based searches of publically accessible information can identify disputes and resolutions used by other consumers and incorporate such disputes and any identified resolution as prior submissions to be mined for formatting, wording, contact information, etc. In some examples, the system can include APIs configured to executed web-based searches for disputes and resolutions (e.g., positive outcomes and associated information can be used to tailor formatting towards (e.g., include similar wording, valuation of dispute, etc.), and negative outcomes and associated information can be used to tailor formatting away from (e.g., remove similar wording, reduce valuation of dispute, etc.)).

In further embodiments, both a consumer and a provider can be users of the dispute management system. Each can access the system via their respective online accounts (for example, after registering with the system) and both users can input outcome information—such as the fact of the successful resolution of the dispute. The system can be configured to store specific information regarding any dispute, associate that information with outcome information, and create an outcome database. In one example, the outcome database can be indexed according to facts that triggered a specific dispute, contractual obligations of the parties in the dispute, applicable regulation, and jurisdictional requirements associated with the dispute, among other examples (as well as any combination of the forgoing). The indexes of dispute information can also be associated with specific outcomes. According to one embodiment, the indexes of dispute information coupled with the outcome information enables the system to further customize the system generated templates for future use, both automatically and via human analysis and intervention.

It is realized that such automated learning approaches applied to dispute resolution solves the long-felt need that practitioners, academics and policymakers have identified regarding the disadvantage that consumers suffer as one-shot, unsophisticated players in their interactions with large businesses. The system's and/or system software's perpetually refining data model and tailored execution presents an unprecedented opportunity to help level the playing field in dispute resolution. In further embodiments, the refining data model enables the system to improve performance and precision over known systems. In some examples, the dynamic selection of survey information and template customization reduces processing and/or memory requirements.

Further, the system may maintain information and statistics for various disputes and resolutions that can be anonymized and used for other users. For instance, success rates, recovery amounts, and other statistical information may be collected from multiple users and provided to other users within a user interface. Further, a collection of dispute information relating to a particular type of dispute may be stored and improved over time, by the collective use by users.

According to another aspect, various embodiments meet the widely and long-felt need for a fast and cost-effective solution for the pro se consumer to correspond with a service provider in a sufficiently clear and formal way to cause the provider to take the consumer's concerns seriously. Whereas consumers routinely report spending hours on the phone addressing such problems, with mixed results, some embodiments allow the user to create and send a 15-page letter in 5 minutes—less than a tenth the time it would take using conventional methods.

Various embodiments of the dispute management system are configured for participation and monitoring of active disputes (as opposed to creating static documents—e.g., wills, trusts, or articles of incorporation). The system can be configured to actively manage and dynamically adjust to information provided in a dispute resolution exchange. In further examples, the system can also be customized to particular counterparties (as opposed to being generic with respect to the identity of the parties). In some implementations, the dispute management system is configured to facilitate calculation of the refund amount that the consumer deems to be fair, or, in further embodiments, likely to be recoverable from the provider. In some embodiments, the system empirically estimates fair value responsive to entry of dispute information and allows the user to edit the completed document.

According to one aspect, a system is provided. The system comprises at least one processor operatively connected to a memory, the at least one processor when running is configured to execute a plurality of system components, wherein the plurality of system components comprise an interactive user interface component configured to display dispute information requests, display generation of a dispute communication in association with entry of responses to the dispute information requests, a generation component configured to select a template associated with a business identified in user responses to the dispute information requests, and a transformation component configured to transform user input received in response to the dispute information requests into template field entries, the transformation component further configured to identify and execute transformation rules on the user input responsive to the identified business or identified dispute to generate the template field entries, and wherein the generation component is further configured to generate a dispute communication object from the selected template and the template field entries and output the dispute communication object.

According to one aspect a system is provided, wherein the system comprises at least one processor operatively connected to a memory, the at least one processor when running is configured to execute a plurality of system components, wherein the plurality of system components comprise: an interactive user interface component configured to: display dispute information requests; display generation of a dispute communication in association with entry of responses to the dispute information requests, a generation component configured to select at least one template associated with a business identified in user responses to the dispute information requests, and a transformation component configured to transform user input received in response to the dispute information requests into template field entries, the transformation component further configured to identify and execute transformation rules on the user input responsive to the identified business or identified dispute to generate the template field entries, wherein the transformation component is configured to: map a first user input field into a first template field, wherein the first user input field specifies a problem type associated with the dispute, map a second user input field into a second template field, wherein the second user input field specifies a problem classified within the problem type, wherein the generation component is further configured to generate a dispute communication object from the selected template and the template field entries and output the dispute communication object, wherein the generation component is further configured to: generate the dispute communication object to include electronic messaging fields associated with an electronic messaging application, and trigger communication of the communication object to the business identified in the user responses.

According to one aspect a system is provided, wherein the system comprises at least one processor operatively connected to a memory, the at least one processor when running is configured to execute a plurality of system components, wherein the plurality of system components comprise: an interactive user interface component configured to: display dispute information requests; display generation of a dispute communication in association with entry of responses to the dispute information requests, a generation component configured to select at least one template associated with a business identified in user responses to the dispute information requests, and a transformation component configured to transform user input received in response to the dispute information requests into template field entries, the transformation component further configured to identify and execute transformation rules on the user input responsive to the identified business or identified dispute to generate the template field entries, wherein the transformation component is configured to execute a first application programming interface (API) configured to: map a first user input field into a first template field, wherein the first user input field specifies a problem type associated with the dispute, map a second user input field into a second template field, wherein the second user input field specifies a problem classified within the problem type, wherein the generation component is further configured to generate a dispute communication object from the selected template and the template field entries and output the dispute communication object, wherein the generation component is further configured to execute a second API to generate the dispute communication object, wherein the second API is configured to: generate the dispute communication object to include electronic messaging fields for an electronic messaging application, and trigger communication of the communication object to the business identified in the user responses.

Any of the preceding systems can be modified as described in the follow embodiments. According to one embodiment, the plurality of system components further comprises a communication component configured to analyze the user input received in response to the dispute information requests to determine communication requirements for the dispute communication object. According to one embodiment, the communication component is further configured to generate a physical letter responsive to determining that the communication requirements specify physical mailing. According to one embodiment, the communication component identifies a class of dispute based on analysis of the user input that includes an unfair or deceptive business practices complaint, and generates the physical letter responsive to determining that the communication requirements derived from generally applicable law and/or contract provisions.

According to one embodiment, the communication component is configured to identify the applicable requirement responsive to analyzing the user input received to identify one of or combinations of a user location, a dispute location, or a business location. According to one embodiment, the communication component is configured to capture communication requirements for each match on the user location, dispute location, or the business location and select either a most stringent set of requirements from the matches or create a merge set of requirements that meets the requirements of each match. According to one embodiment, the interactive user interface component is configured to display a survey to the user. According to one embodiment, the interactive user interface component selects questions to present to the user in the survey, and the selected questions include at least a request for identification of a business provider.

According to one embodiment, the interactive user interface component is configured to display suggested categories associated with common problems that describe the user's dispute. According to one embodiment, the interactive user interface component dynamically selects or refines the suggested categories displayed responsive to matching user input to the dispute information requests. According to one embodiment, the generation component generates the dispute communication object as at least an electronic letter to the identified business. According to one embodiment, the generation component validates that the electronic letter meets the requirements specified by the identified business for particular types of correspondence (e.g., dispute notices) solicited from the consumer by the provider. According to one embodiment, the suggested category includes a "notice of dispute" or similar category, and responsive to selection of the "notice of dispute" or similar category the system executes a provider rule specifying, at least, the provider condition and validates compliance with the provider rule.

According to one embodiment, the industry of the provider is telecommunications (or "telecom") and the substance and process of the software-implemented system are accordingly tailored (e.g., by identifying the leading telecom service providers, identifying the common problems in telecom, bucketing those problems into appropriate telecom categories or "departments," tailoring the mechanics of the refund calculator to the pricing models of, and sorts of complaints observed in, the telecom industry, styling the letter as a "notice of dispute," with components specified by some telecom providers, and/or mailing the letter U.S.P.S. certified mail). According to one embodiment, the system generates a physical letter for mailing through a postal delivery service (e.g., U.S.P.S. or other registered mail or courier service), and the system automatically monitors transit or delivery of the physical letter. According to one embodiment, the communication component includes at least one application programming interface (API) configured to access online tracking services of the postal delivery service and validate delivery.

According to some embodiments any preceding component can be configured for persistently tracking dispute information and updating communication and/or resolution modelling of disputes, communication parameters, and outcome. According to one embodiment, the system further comprises a modelling component configured to automatically execute analysis (e.g., statistical analysis, regression analysis, etc.) of outcome or success metrics, and generate models of dispute behavior or models of dispute outcomes. According to one embodiment, the modelling component analyzes a current user's dispute information, matches the dispute information to a communication model (e.g., models of communication objects, for content, context, fact, regulation references, and legal references that can be used to automatically refine the communication object) or outcome model (e.g., positive or negative outcomes based on facts, context, content of communication object, etc.).

According to one embodiment, the modelling component identifies outcomes (e.g. positive outcomes such as refund offers made by the provider, free service, cancelled contract, etc., and negative outcomes such as refused submission, denied request, additional charges, etc.) and models each outcome as a function of independent factors (e.g., problems exposed to the user in the survey, identified problem categories, identified business, identified facts, format of the communication, references to law (e.g., N.Y. Gen. Bus. Law § 349, etc.)). According to one embodiment, the modelling component dynamically selects or refines template formats (e.g., adds or removes facts, based on associations with positive or negative outcomes, automatically editing the communication object responsive to length-based modelling of outcomes). According to one embodiment, the interactive user interface requests information on a business (e.g., category of business, market sector of business, etc.) and generates lists of candidate providers for display and selection by the user. According to one embodiment, the interactive user interface accepts free text input associated with the business. According to one embodiment, the system automatically validates the free text input of the business (e.g., confirms business information with third party information sources, executes online searching to confirm, etc.), and responsive to validation, creates a listing object for future selection in a drop down listing of candidate providers.

According to one embodiment, the system automatically sorts problems into department categories (e.g., goods, services, billing, customer service, etc.). According to one embodiment, the system is configured to dynamically refine user options displayed responsive to the user's selection of the relevant departments, wherein problems bucketed exclusively into irrelevant departments are suppressed. According to one embodiment, the system is further configured to model outcomes based on the selected department categories (e.g., limit modelling to data obtained on matching or similar categories) and compare with unrefined outcome models.

According to one embodiment, the system is configured to select a problem presentation and tailor the communication object accordingly that yields an improved outcome probability responsive to the comparison. According to one embodiment, the interactive user interface is configured to progressively display to the user the information needed to identify the problems and respond to the system selected information requests. According to one embodiment, the interface includes graphical user interface elements that adhere to design best practices, such as "progressive disclosure" (e.g., large and bold-faced font is applied to a concise "name" for the problem, while less prominent but proximate "help text" clarifies the concept in a short sentence, and the final communication object fleshes out the problem in one or more sentences, paragraphs or subdivisions). According to one embodiment, the system is configured to automatically identify user problems, responsive to enabling system access to information sources (e.g., third party e-mail accounts, business accounts, a database containing relevant information or an account with the provider, etc.).

According to one embodiment, the system further comprises a valuation component which can include an automated wizard that guides the user through a calculation of value associated with the dispute (e.g., how much she deems appropriate for the business to refund as a result of the problems identified). According to one embodiment, the valuation component calculates the value for a requested refund by taking the product of one or more of the following user-entered data points: (1) a recurring dollar amount; (2) a percentage of that amount (or, as appropriate, one minus that percentage); and (3) the number of periods of recurrence. According to one embodiment, the valuation component is configured to model a range of value for the dispute, and further model a probability of a positive outcome based on value points within the range of value. According to one embodiment, the system automatically selects the value associated with the greatest probability of a positive outcome, or, alternatively, the greatest expected value (e.g., on a probability-weighted basis). According to one embodiment, the system displays the range of value and each associated probability of a positive outcome.

According to one embodiment, the system is configured to check template entries for consistency and prompt the user for confirmation of apparent inconsistencies or edit template entries automatically to force consistency. According to one embodiment, the valuation component calculates and displays a running total refund request while the user is progressing through a series of input-capturing interfaces. According to one embodiment, the valuation component generates a model of value dynamically responsive to user input of dispute information, and further updates the model of value at each data entry. According to one embodiment, the system includes free text displays for accepting the user's elaboration or description of the problems complained of, and wherein the system captures and transcribes the user's narrative verbatim. According to one embodiment, the user's narrative is automatically analyzed in real time as she types and the system provides her real-time feedback on the length, substance and/or style of her composition.

According to one embodiment, the system is configured to accept user upload of documentation of the problems she has identified. According to one embodiment, the system is configured to accept user specification of an online source of dispute information, including any credentials required to access it. According to one embodiment, the notice of dispute consists of a preamble with the user's account information, followed by three substantive parts, the first factual, the second legal, and the third precatory. According to one embodiment, a system defined template specifies that (1) the first part includes (i) a brief background on the particular provider, how it represents itself, its history, its business operations and its customer service track record; (ii) recitation of the problems the user has selected and elements of the calculations the user has performed regarding them, incorporated into the text as complete grammatical sentences; and (iii) the user's explanation of the problems in her own words; (2) the second part includes a static, citation-driven summary of causes of action that a consumer may bring against his service provider or a list of causes of action automatically mapped to problems identified by the user; and (3) the third part begins with a static, citation-driven summary of doctrine concerning liability and damages and concludes by explaining and aggregating the user's calculations of what she feels would amount to a fair refund.

According to one embodiment, the second and third parts are customized to the user's jurisdiction and/or the provider's industry. According to one embodiment, the system is configured to enable the user to edit the generated communication object (e.g., letter) before it is finalized. According to one embodiment, the user may electronically sign the finished letter. According to one embodiment, the system is configured to deliver the communication object or at least part of the communication object to one or more relevant regulatory agencies responsive to user selection in the interactive user interface According to one embodiment, the user pays a flat fee for the use of the software. According to one embodiment, the user pays a fee that is a function of the user's refund request, or the provider's refund offer, or the amount that the user actually receives from the provider, or the amount the user is subsequently awarded by a court or arbitrator. According to one embodiment, after the expiration of the period of time prescribed by statute or by the contract associated with the identified business, the system automatically notifies the user, provides relevant general information to the user, and asks the user to update her account to reflect key developments in her situation, including any offer made by the provider and her acceptance thereof. According to one embodiment, a money-back guarantee is available to users who fail to receive a refund from their provider above a particular threshold-such as the purchase price or license fee to access the system.

According to another aspect, a computer implemented method is provided for executing the functions of any individual system element described above, and in further embodiments, in any combination of any function of any individual system element described above are provided. According to another aspect means for executing the functions of any individual system element described above, and in further embodiments, in any combination of any function of any individual system element described above are provided.

According to another aspect a computer implemented method is provided. The method comprises displaying, in a user interface, dispute information requests, displaying, in a user interface. generation of a dispute communication in association with entry of responses to the dispute information requests, selecting, by a computer system, a template associated with a business identified in user responses to the dispute information requests, and transforming, by the computer system, user input received in response to the dispute information requests into template field entries, wherein transforming includes acts of identifying and executing transformation rules on the user input responsive to the identified business or identified dispute to generate the template field entries; and generating, by the computer system, a dispute communication object from the selected template and the template field entries and output the dispute communication object.

According to one embodiment, the method further comprises analyzing the user input received in response to the dispute information requests, and determining communication requirements for the dispute communication object. According to one embodiment, the method further comprises generating a physical letter responsive to determining that the communication requirements specify physical mailing. According to one embodiment, the method further comprises identifying a class of dispute based on analysis of the user input that includes an unfair or deceptive business practices complaint, and generates the physical letter responsive to determining that the communication requirements derived from generally applicable law and/or contract provisions. According to one embodiment, the method further comprises identifying the applicable requirement responsive to analyzing the user input received to identify one of or combinations of a user location, a dispute location, or a business location.

According to one embodiment, the method further comprises capturing communication requirements for each match on the user location, dispute location, or the business location and select a most stringent set of requirements from the matches or create a merge set of requirements that meets the requirements of each match. According to one embodiment, the method further comprises displaying a questionnaire to the user. According to one embodiment, the method further comprises selecting questions to present to the user in the questionnaire, and the selected questions include at least a request for identification of a business provider. According to one embodiment, the method further comprises displaying suggested categories associated with common problems that describe the user's dispute. According to one embodiment, the method further comprises dynamically selecting or refines the suggested categories displayed responsive to matching user input to the dispute information requests.

According to one embodiment, the method further comprises generating the dispute communication object as at least an electronic letter to the identified business. According to one embodiment, the method further comprises validating that the electronic letter meets the requirements specified by the identified business for particular types of correspondence (e.g., dispute notices) solicited from the consumer by the provider. According to one embodiment, the suggested category includes a "notice of dispute" or similar category, and the method further comprises responsive to selection of the "notice of dispute" or similar category executing a provider rule specifying, at least, the provider condition and validates compliance with the provider rule.

According to one embodiment, wherein the industry of the provider is telecommunications and the substance and process of the software-implemented system are accordingly tailored (e.g., by identifying the leading telecom service providers, identifying the common problems in telecom, bucketing those problems into appropriate telecom departments, tailoring the mechanics of the refund calculator to the pricing models of, and sorts of complaints observed in, the telecom industry, styling the letter as a "notice of dispute," with components specified by some telecom providers, and/or mailing the letter U.S.P.S. certified mail). According to one embodiment, the method further comprises generating a physical letter for mailing through a postal delivery service (e.g., U.S.P.S. or other registered mail or courier service), and automatically monitoring transit or delivery of the physical letter.

According to one embodiment, the method further comprises executing at least one application programming interface (API) configured to access online tracking services of the postal delivery service and validate delivery. According to one embodiment, the method further comprises persistently tracking dispute information and updating communication and/or resolution modelling of disputes, communication parameters, and outcome. According to one embodiment, the method further comprises automatically executing analysis (e.g., statistical analysis, regression analysis, etc.) of outcome or success metrics, and generate models of dispute behavior or models of dispute outcomes. According to one embodiment, the method further comprises analyzing a current user's dispute information, matches the dispute information to a communication model (e.g., models of communication objects, for content, context, fact, regulation references, and legal references that can be used to automatically refine the communication object) or outcome model (e.g., positive or negative outcomes based on facts, context, content of communication object, etc.).

According to one embodiment, the method further comprises identifying outcomes (e.g. positive outcomes such as refund offers made by the provider, free service, cancelled contract, etc., and negative outcomes such as refused submission, denied request, additional charges, etc.) and models each outcome as a function of independent factors (e.g., problems exposed to the user in the questionnaire, identified problem categories, identified business, identified facts, format of the communication, references to law (e.g., N.Y. Gen. Bus. Law § 349, etc.)). According to one embodiment, the method further comprises dynamically selecting or refining template formats (e.g., adds or removes facts, based on associations with positive or negative outcomes, automatically editing the communication object responsive to length-based modelling of outcome). According to one embodiment, the method further comprises requesting information on a business (e.g., category of business, market sector of business, etc.) and generates lists of candidate providers for display and selection by the user. According to one embodiment, the method further comprises accepting free text input associated with the business.

According to one embodiment, the method further comprises automatically validating the free text input of the business (e.g., confirms business information with third party information sources, executes online searching to confirm, etc.), and responsive to validation, creates a listing object for future selection in a drop down listing of candidate providers. According to one embodiment, the method further comprises automatically sorting problems into department categories (e.g., goods, services, billing, customer service, etc.). According to one embodiment, the method further comprises dynamically refining user options displayed responsive to the user's selection of the relevant departments, wherein problems bucketed exclusively into irrelevant departments are suppressed.

According to one embodiment, the method further comprises modelling outcomes based on the selected department categories (e.g., limit modelling to data obtained on matching or similar categories) and compare with unrefined outcome models. According to one embodiment, the method further comprises selecting a problem presentation and tailors the communication object accordingly to yield an improved outcome probability responsive to the comparison. According to one embodiment, the method further comprises progressively displaying to the user the information needed to identify the problems and respond to the system selected information requests.

According to one embodiment, the interface includes graphical user interface elements that adhere to design best practices, such as "progressive disclosure" (e.g., large and bold-faced font is applied to a concise "name" for the problem, while less prominent but proximate "help text" clarifies the concept in a short sentence, and the final communication object fleshes out the problem in one or more sentences or paragraphs). According to one embodiment, the method further comprises automatically identifying user problems, responsive to enabling system access to information sources (e.g., third party e-mail accounts, business accounts, a database containing relevant information or an account with the provider, etc.). According to one embodiment, the method further comprises guiding the user through a calculation of value associated with the dispute (e.g., how much she deems appropriate for the business to refund as a result of the problems identified), optionally via an automated wizard. According to one embodiment, the method further comprises calculating the value for a requested refund by taking the product of one or more of the following user-entered data points: (1) a recurring dollar amount; (2) a percentage of that amount (or, as appropriate, one minus that percentage); and (3) the number of periods of recurrence.

According to one embodiment, the method further comprises modelling a range of value for the dispute, and further modelling a probability of a positive outcome based on value points within the range of value. According to one embodiment, the method further comprises automatically selecting the value associated with the greatest probability of a positive outcome, or, alternatively, the greatest expected value (e.g., on a probability-weighted basis). According to one embodiment, the method further comprises displaying the range of value and each associated probability of a positive outcome. According to one embodiment, the method further comprises checking template entries for consistency and prompts the user for confirmation of apparent inconsistencies or edits template entries automatically to force consistency.

According to one embodiment, the method further comprises calculating and displaying a running total refund request while the user is progressing through the survey. According to one embodiment, the method further comprises generating a model of value dynamically responsive to user input of dispute information, and further updates the model of value at each data entry. According to one embodiment, the method includes free text displays for accepting the user's elaboration or description of the problems complained of, and capturing and transcribing the user's narrative verbatim.

According to one embodiment, the user's narrative is automatically analyzed in real time as she types and the system provides her real-time feedback on the length, substance and/or style of her composition. According to one embodiment, the method further comprises accepting user upload of documentation of the problems she has identified. According to one embodiment, the method further comprises accepting user specification of an online source of dispute information, including any credentials required to access it. According to one embodiment, the notice of dispute consists of a preamble with the user's account information, followed by three substantive parts, the first factual, the second legal, and the third precatory.

According to one embodiment, the method further comprises specifying via a template that (1) the first part includes (i) a brief background on the particular provider, how it represents itself, its history, its business operations and its customer service track record; (ii) recitation of the problems the user has selected and elements of the calculations the user has performed regarding them, incorporated into the text as complete grammatical sentences; and (iii) the user's explanation of the problems in her own words; (2) the second part includes a static, citation-driven summary of causes of action that a consumer may bring against his service provider or a list of causes of action automatically mapped to problems identified by the user; and (3) the third part begins with a static, citation-driven summary of doctrine concerning liability and damages and concludes by explaining and aggregating the user's calculations of what she feels would amount to a fair refund.

According to one embodiment, the second and third parts are customized to the user's jurisdiction and/or the provider's industry. According to one embodiment, the method further comprises enabling the user to edit the generated communication object (e.g., letter) before it is finalized. According to one embodiment, the method further comprises electronically signing the finished letter. According to one embodiment, the method further comprises delivering the communication object or at least part of the communication object to one or more relevant regulatory agencies responsive to user selection in the interactive user interface. According to one embodiment, the method further comprises paying a flat fee for the use of the software.

According to one embodiment, the method further comprises paying a fee that is a function of the user's refund request, or the provider's refund offer, or the amount that the user actually receives from the provider, or the amount the user is subsequently awarded by a court or arbitrator. According to one embodiment, after the expiration of the period of time prescribed by statute or by the contract associated with the identified business, the method further comprises automatically notifying the user, providing relevant general information to the user, and asking the user to update her account to reflect key developments in her situation, including any offer made by the provider and her acceptance thereof. According to one embodiment, a money-back guarantee is available to users who fail to receive a refund from their provider above a particular threshold—such as the purchase price or license fee to access the system.

Still other aspects, embodiments and advantages of these exemplary aspects and embodiments are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 5 categorizes certain factors as outcome (i.e., left-hand side or "LHS") variables and others as independent (i.e., right-hand side or "RHS") variables previously unavailable for rigorous statistical analysis at scale by consumers, according to one embodiment;

FIG. 6 is a block diagram of an example dispute management system, according to one embodiment;

FIG. 7 illustrates example pseudo-code that can be executed by various embodiments;

FIGS. 10A-B are an example user interface according to one embodiment;

FIGS. 11A-D are an example user interface according to one embodiment;

FIG. 12 is an example user interface according to one embodiment;

FIG. 14 illustrates example pseudo-code that can be executed by various embodiments; and FIG. 15 illustrates example pseudo-code that can be executed by various embodiments.

DETAILED DESCRIPTION

According to some embodiments, a dispute management system enables a consumer to draft a letter addressed and tailored to a provider of goods and/or services to identify a consumer complaint and request recourse. In one embodiment, a consumer completes a software-presented questionnaire, which questionnaire responses are used by the system to customize and populate a templated form letter. According to one embodiment, the dispute management system dynamically tailors the questionnaire to a consumer's needs. Each response provided to the system by the consumer can be configured to trigger additional selections and/or refinements in the questions presented, until further refinement or selection is unnecessary. In some examples, the dynamic selection of survey questions selects specific questions from a pool of possible choices to improve the efficiency and accuracy of the dispute management system.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
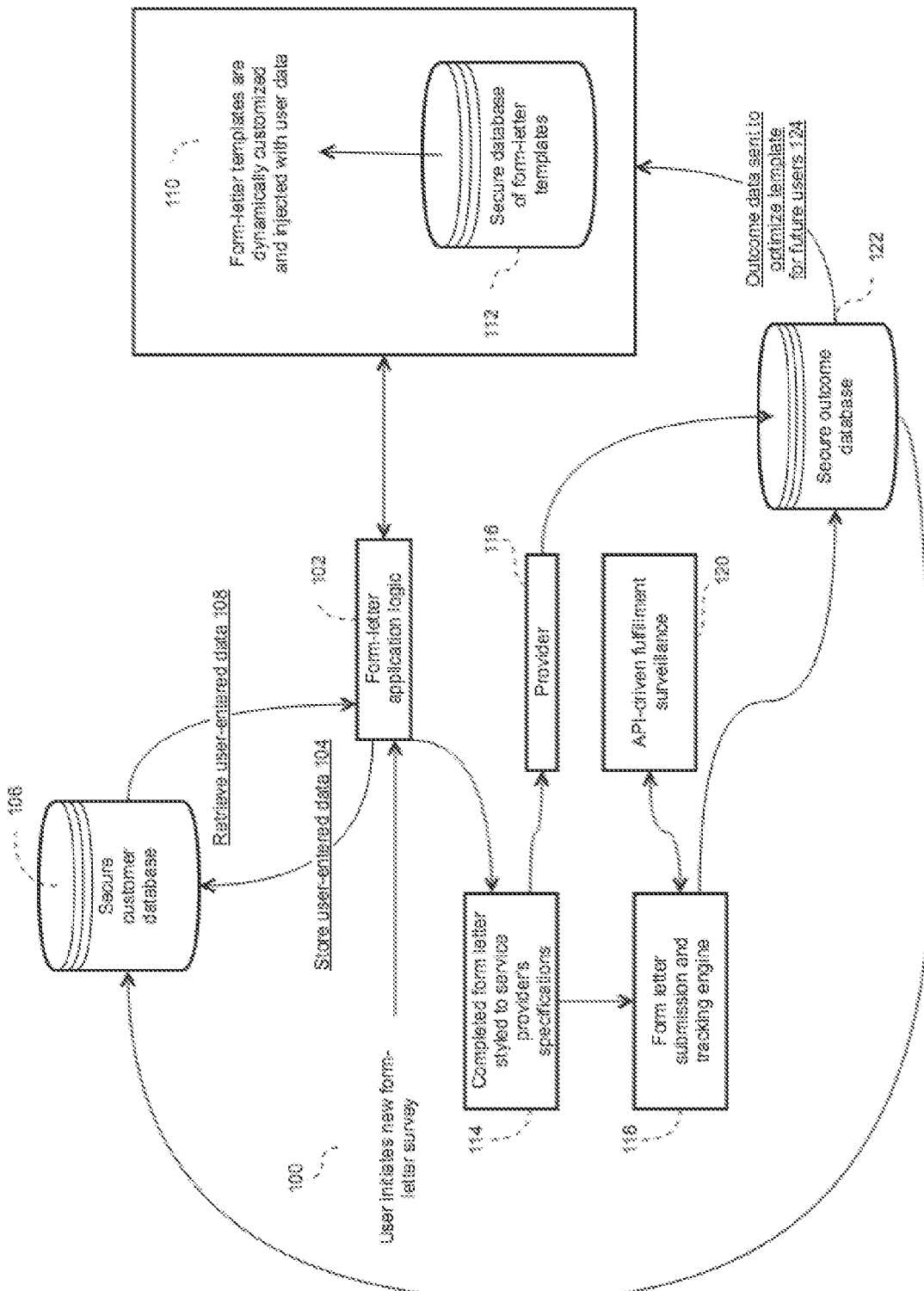
FIG. 1 is a block diagram of an example schematic according to one embodiment.

FIG. 1 shows a block diagram of example architecture of the dispute management system. According to one embodiment, the user initiates 100 a new questionnaire in a user interface displayed the user to create a new form letter. The form-letter application logic 102 stores 104 user-supplied data in the secure customer database 106, which in turn supplies data 108 to the application logic 102 executed by the system for returning or otherwise known (e.g., registered or guest) users. A secure database of blank templates 112 supplies the forms to be dynamically customized and injected 110 with user data. The end result is a completed letter styled 114, in certain embodiments, to an identified business's specifications. In some embodiments, the letter is sent to the business 116 and its delivery is tracked 118 via an API-driven fulfillment surveillance routine 120. In further embodiments, the letter is mapped into e-mail communication fields (e.g., recipient, subject, body, attachments, etc.). Read requests can be triggered by API processes (e.g., 120), which can monitor confirmation of receipt and/or reading of the electronic message itself. In one embodiment, the API is configured to activate message tracking functions associated with a commercially available e-mail application and/or service (e.g., OUTLOOK, GMAIL, etc.).

In some implementations, the system is configured to request information from both participants. For example, the system automatically requests outcome information from both participants. In one example, e-mail requests are directed to the user and/or to the business regarding any outcome for a dispute letter. The outcome information can be stored in an outcome database 122. The outcome data is captured and analyzed by the system to improve and/or automatically modify (e.g., at 124) the letter templates 112 for future use. In some implementations, the system automatically edits letter templates and/or their corresponding questionnaires responsive to analysis of outcome information (e.g., when identified facts within the dispute lead to positive outcomes, those facts are exposed more prominently in the survey). In some embodiments, the system can execute queries on historic or tracked outcome information to identify positive results, matching problems and/or circumstances, and use prior event descriptions to tailor current user interface displays, and solicit current user information in a same or similar format as prior successful interactions. In further embodiments, negative outcomes are tracked in an outcome database. User input can be matched to problems having negative outcomes (e.g., no resolution provided or offered), and user descriptions searched for negative results. In some examples, the terms that are matched to unresolved or poorly resolved problems can be identified in the user interface. The system can be configured to suggest different terms or suggest removal of text matching disputes having poor outcomes and may automatically replace or remove terms or wording in the user description to match disputes having positive outcomes. In other embodiments, system-based analysis can be presented for human-based intervention (e.g., editing of templates, acceptance in a user interface display, etc.). In yet other embodiments, system-based recommendations can be presented for human user approval before altering a template.

In other embodiments, an end user can access the system through a website (via mobile or non-mobile computing devices), or download a native application containing software to the user's computing device (e.g., mobile phone, tablet, laptop, or desktop computer).

After a user arrives at a home page or landing page explaining the purpose, benefits and mechanics of the software, the user can begin to use the system and register for it. In some embodiments, a user can be given access through a guest account. In one example, functionality provided through the guest account may be reduced. According to one embodiment, an introductory or "splash" page clarifies that the software/system is not a lawyer or a replacement for one, and is not suitable for every communication a user may want to send to a business. In further examples, the system provides notification that the system is not providing legal advice and requires that the user acknowledge that any dispute may require legal analysis, which the system and/or software does not provide or consider. In further examples, the acknowledgement is used by the system as a prerequisite for access and/or registration.

Figure 2:
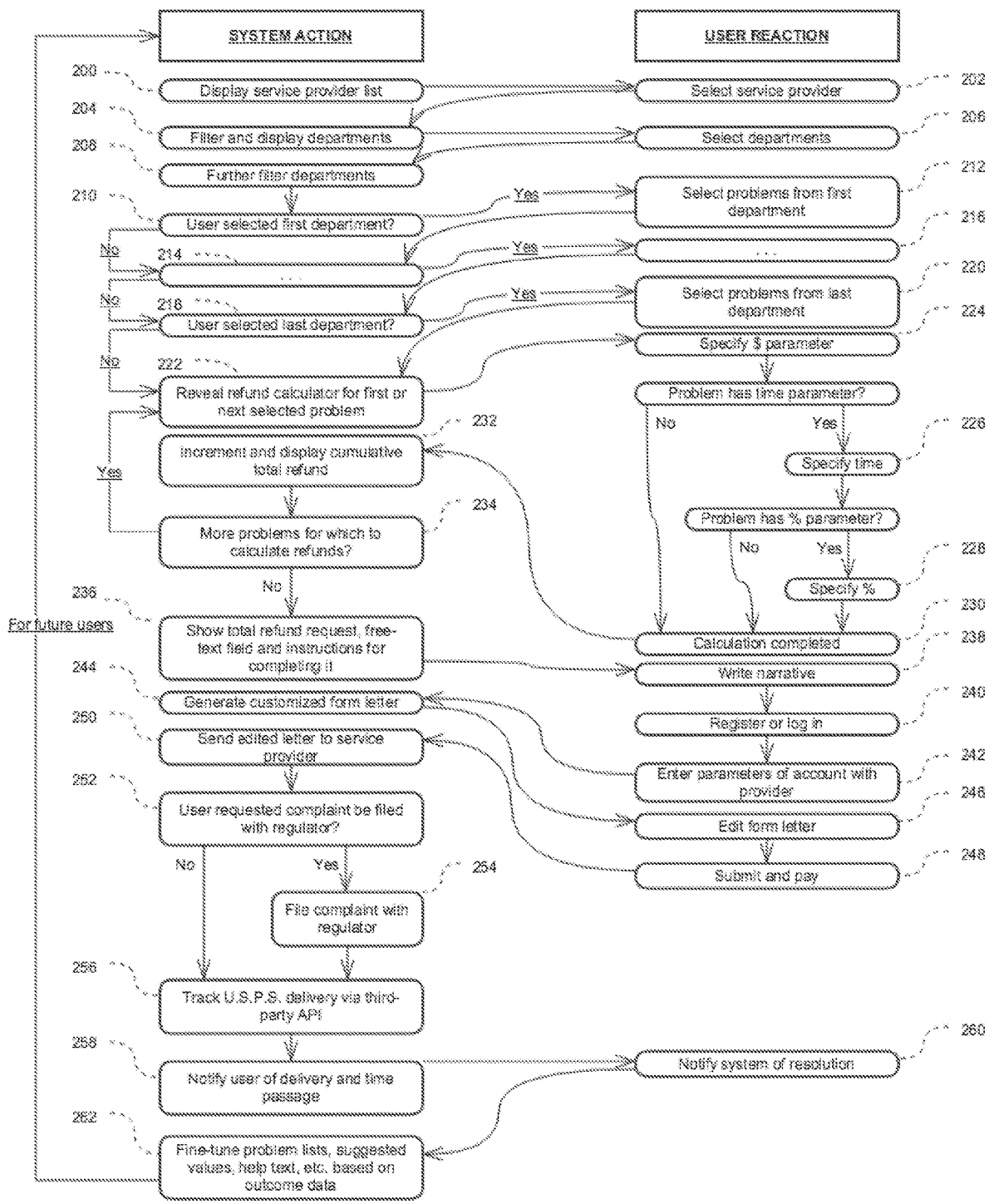
FIG. 2 is an example flow diagram for generating a communication object, according to one embodiment.

An example of system execution is illustrated with FIG. 2. FIG. 2 is an example process for generating a communication object (e.g., a letter (in electronic or physical form)). In some the embodiments, the process begins with a user's accessing the system via an application or a webpage. The application or webpage can display service providers for selection by a user. In other examples, a user can enter free text information about a dispute, and the system can automatically parse the free text input to suggest providers or dispute categories and/or to refine survey questions presented to the user.

In some embodiments, the home page displays a list of service providers to whom the user may draft a customized form letter 200. For example, the user may select a provider or business from a drop down menu at 200. In another example, the user can identify a business within a free text input window and the system can present business category information to select an appropriate template.

The process continues with the user selecting a service provider 202 from, for example, a drop down list. In other embodiments, if the user's service provider is not listed, the user is redirected to a structured contact form for identifying a business or provider. The system can be configured to validate and/or approve requests to add business and/or service providers automatically. For example, the system can access an online presence associated with the provider, verify the user provided identifying information, and, in further examples, capture terms of use, terms of service, dispute resolution provisions, etc., made available through the provider's online presence. The system can match the terms of use, or other dispute resolution requirements, to existing templates and store an association between the new provider and a template form.

In other examples, the system can extract provider requirements from any terms specified on their respective website and create a template customized for the new provider. In other embodiments, the system can require and/or request administrator approval before adding a new business or provider.

After selecting a provider, the process optionally continues at 204 with display and selection of departments within a service provider or business. According to some embodiments, department selection is optional and in other embodiments, department selection is not executed. Where department selection is executed the department selection can be used by the system to filter candidate problems presented to the user.

Figure 3:
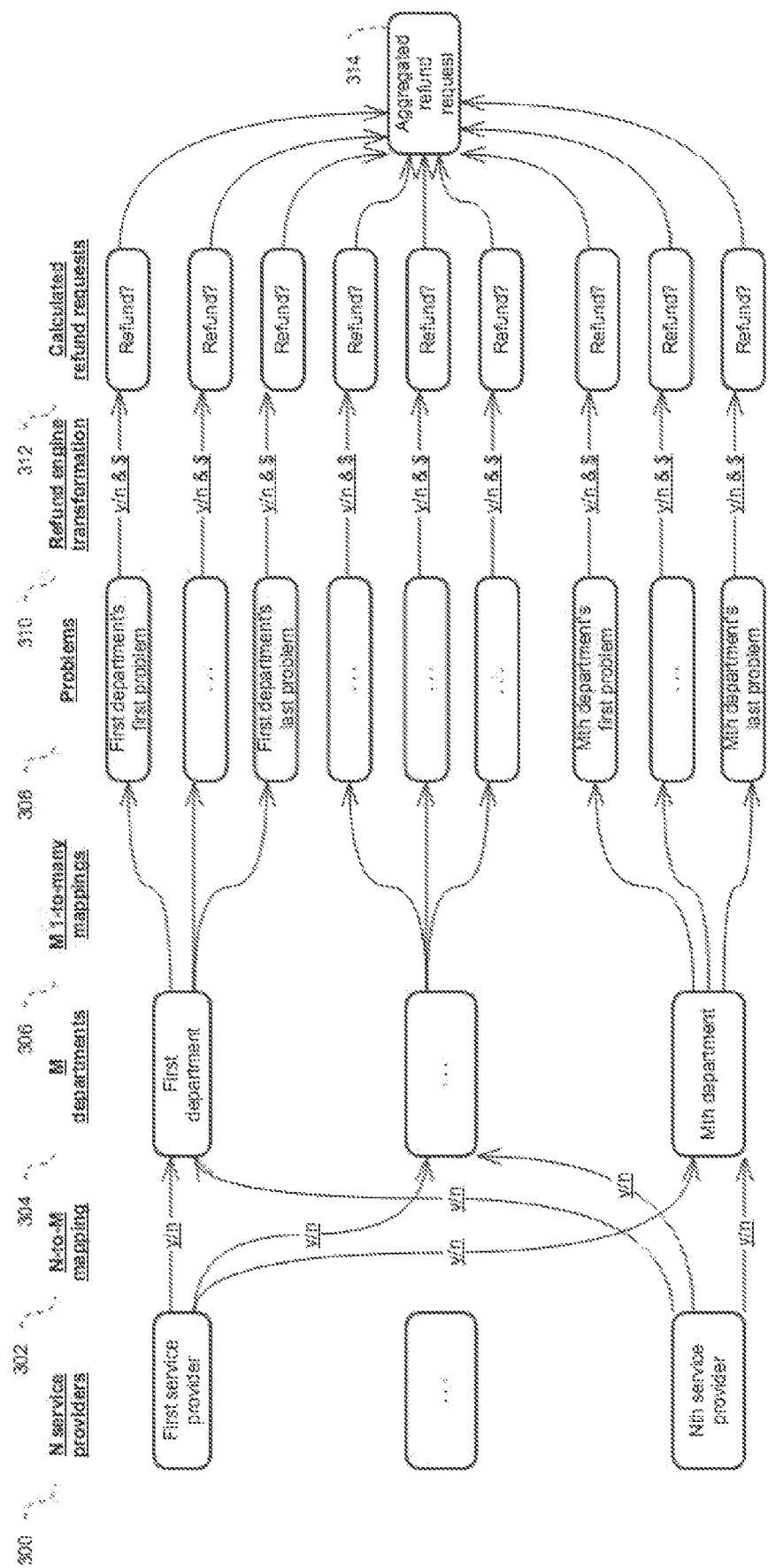
FIG. 3 depicts an example data model, according to one embodiment.

According to one embodiment, the process of FIG. 2 is executed in conjunction with the data model show in FIG. 3. In other embodiments, different data models can be used to capture business information and dispute information and create associations with dispute outcomes. Different processes can be used, for example, in conjunction with the business model shown in FIG. 3 and in conjunction with other data models. In other embodiments, various steps shown in FIG. 2 can be consolidated, omitted and/or executed in a different order.

For the purposes of clarity, the following description of the process assumes execution in conjunction with the data model shown in FIG. 3. In some embodiments, the system can have assigned one or more "departments" non-exclusively to each service provider 302. In one example, the system can automatically assign departments. In other examples, administrative users create department descriptions or assign department descriptions to providers and/or businesses. In one embodiment, department assignment can include "billing," "customer support," and the like. Conceptually, departments 306 are used by the system to organize and display categories of problems 308 that a user may encounter with the given service provider.

Thus, the system filters at 204 the list of departments down to those applicable to the selected provider and displays a multi-select list of the resulting departments. At 206, the user selects as many of these departments as apply to her. In some embodiments, the system is configured to move the user through the departments in a logical order. For the first department in that order, the program checks 210 whether the user has selected it. If so, the system displays the problems pertaining to that department.

According to some implementations, the problems selected by the system are pre-defined into groupings of problem reports that have been selected for inclusion in the given department. The initial definition of problem reports can be the result of analyzing and categorizing hundreds or thousands of real-world consumer complaints regarding providers in the provider's industry. The system can produce and/or access a histogram of problems to facilitate problem selection (e.g., based on frequency of complaint, among other parameters). For instance, in the telecommunications industry, top-ranking complaints include slow internet, broken service appointments and overcharges. In other embodiments, use of the system by the user population generates, for example, new problem reports and new providers. The system can be configured to automatically associate such new problems with department categories and further incorporate the new problem-department designations into subsequent displays.

According some embodiments, each problem can be defined on the system as a problem object. In one example, the problem object is defined with a concise "name" field of just 1 or a few words. The system can be configured to displayed the name field in large font to make it efficient for the user to recognize and select it, as well as display problem objects with the name and a "description" or help text field, which elaborates in smaller font in case the user is unsure whether the particular problem applies to her.

For example, one problem object can be defined with the name "Hot potato" and the description "{{provider}} representatives passed my call around like a hot potato." In the descriptive text and embodiment, double curly brackets are used to indicate a system variable that the system requests from the user as input into various user interface displays. In some examples, the system can extract the variables from free text input and automatically populate the fields based on extracted and/or imported text. In one example, the {{provider}} variable is populated by the system with the service provider's name according to the user's selection at the beginning of the questionnaire. In another example, the system extracts the provider name from free text input and populates the template field automatically.

According to one embodiment, after the user is shown the most frequent problems for the displayed department, the system accepts the user's selections 212 of all that apply. In some embodiments, some problems are automatically flagged as potentially applicable to the user after the user grants the system and/or application access to a database containing problem information, such a user email account or a user account with the provider. In some examples, the user can provide user credentials (e.g., user name and password) and the system can automatically capture problem information.

The process continues at 214 and 216 with recursive execution through each department and specification of problem information from within each applicable department. Once a final department is selected at 218 and any problems specified at 220, the process can continue with a determination of a value of any one or more of the previously selected problems.

According to one embodiment, the system includes a "wizard" 222 (e.g., guided user interface displays configured to walk the user through the calculation) to help the user calculate how much it would be logical for the business to refund as a result of the input problems. For each problem selected by the user, the wizard provides a sentence with blanks for the user to populate at 310. The sorts of terms the user populates include the product at issue (in some embodiments, the product can be chosen from a drop-down list populated on a problem-by-problem basis based on empirical histogram analysis), a dollar amount, a length of time, and a percentage. Some examples of names of problems and their corresponding refund calculations include the following:

1. Broken: "The {{product}} {{provider}} sold me for ${{money}} doesn't do what {{provider}} promised."

2. Phony discount on smartphone: "{{provider}} failed to disclose that my bill would be increased ${{money}} per month for {{time}} months to account for the "discount" on my phone.
3. Slow internet: "{{provider}} has only delivered about {{percent}}% of the speed it promised, while charging me the full ${{money}} per month for {{time}} months."

In the example (1) above, the system calculates a refund equal to whatever the user paid for the faulty product, which the user enters as a dollar amount at 224. According to some embodiments, responsive to selection of the provider and the problem, the system dynamically selects from potential products and displays menus to the user for selection. In some examples, the user can also indicate that the displayed price for the product is not accurate, and input appropriate data for price.

In the example (2) above, the calculated refund is equal to the number of months 226 the user has been overbilled times the amount 224 of the monthly overcharge. Each of the two variables the user enters via a separate interaction. In one embodiment, the system is configured to request information on the user's problem (e.g., overbilling) and solicit additional information to obtain the value estimate. For example, the calculated refund for example 3 above is equal to one minus the percentage performance 228 times the number of months 226 the deficiency persisted times the amount of the monthly bill 224. Each of the three variables the user enters via a separate interaction.

Figure 4:
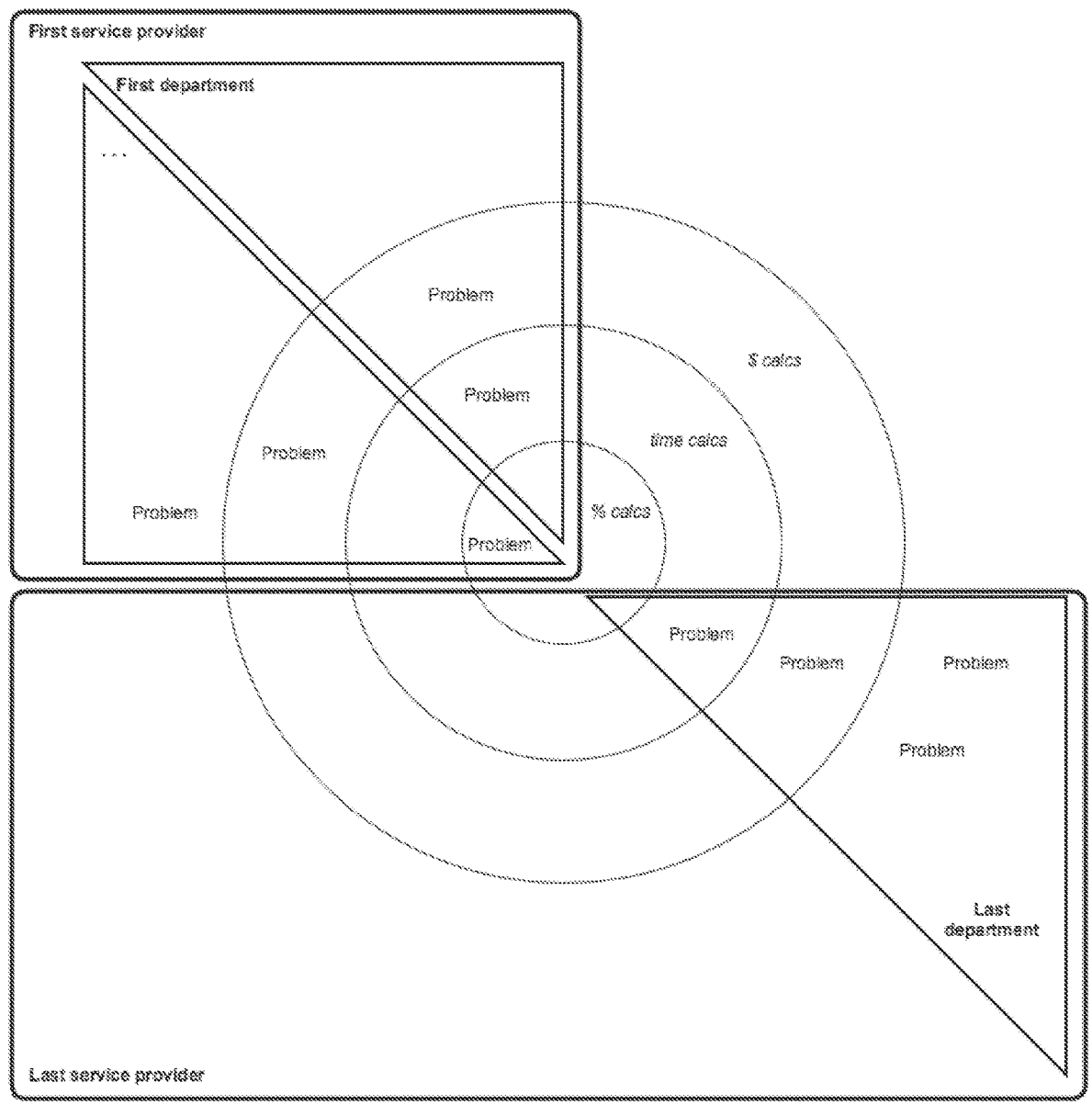
FIG. 4 depicts this same data model, emphasizing the set theoretical features of an embodiment of the data model.

In one embodiment, every refund calculation incorporating a percentage also incorporates a time, and every refund calculation incorporating a time also incorporates a dollar amount. Such an embodiment is depicted in FIG. 4. FIG. 4 is an example data model specified using set-theoretic notation. As shown in FIG. 4, service providers each have one or more departments, departments span problems (i.e., every problem is in exactly one department), and there are three types of refund/valuation calculations: (1) money; (2) money times time; and (3) money times time times a percentage (or one minus a percentage, as applicable).

According to some embodiments, the system and/or the data model implemented is configured to constrain the values that the user may select for a given variable (e.g., monetary value). For instance, dollar amounts may be constrained to whole dollar amounts (no pennies), and percentages may be constrained to multiples of 10%. Such constrained values can be displayed to the user in drop down menus for selection. Other embodiments are configured to further limit the constrained values to eliminate high and low value calculations in order to simplify user selection. It is realized that overwhelming the user with valuation analysis can impede dispute resolution.

According to one embodiment, the process continues after the user completes a first valuation at 230. The valuation determination steps can be executed for each problem specified and each valuation stored as part of a refund calculation 312. For each session including more than one specified problem the system is configured to tally a cumulative total (e.g., data element 314 of FIG. 3) or, if it has already started tallying such cumulative total, the system increments a tally at 232 by the newly calculated amount. If the user skips or fails to complete the calculation for a given problem, the total is not incremented, and an icon notifies the user that she has skipped the given calculation.

In some embodiments, as the user progresses through the wizard, the system provides automated positive feedback to the user in one or both of two ways. First, the system displays a completion icon (such as a check mark) or the calculated amount next to each problem that the user successfully completes. Second, as noted, the system is configured to show a running tally 232 of the total refund that the user has calculated so far.

At 234, the process includes a check for whether there remain problems for which the system may calculate a problem valuation (e.g., a requested refund). If so, the process repeats at 222-232, according to the specification of the next problem. If not, the system displays the total requested refund at 236. In some embodiments, the total is displayed in proximity to a free text field for specifying dispute information (e.g., specific names, dates, locations and dollar amounts, for example, to support the problems the user has selected and justify the refund amount the user is requesting). According to one embodiment, the system displays instructions in conjunction with the free text display to elicit relevant information. In one example, the free text field is prepopulated with information from the system's database or prepopulated from the user's earlier survey responses. At 238, the user is prompted to explain what has gone wrong with the service provider. In one embodiment, the system is configured to transcribe what the user writes verbatim.

In certain embodiments, the user may upload documentation of her problems. Examples of such documentation can include scans of bills, screenshots of internet speed tests, recordings of calls and photos of mobile phones or TV screens, e-mails to customer service, call logs, voicemail recordings, etc.

In certain embodiments, the user then registers for an account or, if he already has one, logs in at 240. In some examples, the system executes one or more of the preceding steps automatically based on analysis of the provided documentation. In other embodiments, the user registers or logs in at a different point in the workflow.

At 242, the user can enter her contact information and the number that identifies her account with the provider. If she is not the account holder, the user can also enter the account holder's information. In various embodiments, the main purpose of this information is to allow the provider to identify the account.

At 244 the system uses the supplied information to populate the form letter template with the information applicable to the particular user and provider. In certain embodiments, this letter is styled a "Notice of Dispute" or "NOD" whereas in other embodiments, the letter may be styled as a paper appropriate for other use cases. In some examples, the system uses the input information to select a specific template, and then uses the supplied information to complete data fields within the selected template. In some embodiments, template selection causes the system to dynamically display questions specific to completing the various data fields of the specific template and/or a specific provider.

In certain embodiments, the system is configured to generate a communication object (e.g., a letter), having multiple parts drawn from the user input regarding their dispute. In one example, the communication object beings with a preamble containing the user's account information. Another example includes the preamble and three parts: relevant facts, general legal background, and the user's refund request.

In one embodiment, the first part of the letter (e.g., the facts) contains:
1. a brief background on the particular provider, how it represents itself, its history, its business operations and its customer service track record;

2. a recitation of the problems the user has selected; and
3. the user's explanation of the problems in her own words.

In certain embodiments, each problem listed in (2) above is generally fleshed out beyond its "name" and "description" fields, previously described. For example, for the problem named "Hot potato", the "fact output text" in the NOD is:

"{{provider}} customer service representatives seem to play a game of "hot potato" with my phone calls, transferring my call to representative after representative rather than resolving the problem we are discussing. {{provider}} representatives have promised to transfer me to the correct point-of-contact, only to instead transfer me to the wrong point-of-contact. Often, {{provider}} leaves me on hold for long periods of time between these transfers. Cynical as this may sound, I cannot help but get the impression that {{provider}}'s representatives are more concerned with getting me off of their plate than actually resolving the problems with my {{provider}} service."

Thus, according to some implementations the system and/or a system administrator can select predefined problems based on sufficiently specific recurring problems that are readily identified by the consumer from a concise description and readily adaptable to template elaboration. In other examples, the system can be configured to dynamically generate additional descriptions, responsive to matching a problem type, matching underlying facts of the problem, and/or matching a provider and previously used descriptions for that provider.

In certain embodiments, where appropriate, elements of the refund/valuation calculation are also included in the fact output text. For example, the fact output text for the problem "Phony discount on smartphone" includes the amount by which the monthly bill was increased, and for how many months. Elegant branching is used so that the fact output text reads cleanly even if the user has failed to complete the refund calculation for the given problem. For example, for "Phony discount on smartphone," the code of the fact output text is: "{{provider}} induced me to do business with it by promising a "discounted" smartphone. My "discounted" phone was actually full-price, spread out across {% if time %} {{time}} {% endif %} monthly bills{% if money %}, at ${{money}} per month, {% endif %} so as to be less conspicuous. {{provider}} did not clearly disclose upfront that it would amortize the rack-rate price of the phone in this way. To the contrary, it implied that I was getting a discount."

Thus, in the example above, if, for instance, the provider is Wireless Co X, the time selected by the user is 24 months, but the user has selected no dollar amount, the fact output text reads cleanly as:

"Wireless Co X induced me to do business with it by promising a "discounted" smartphone. My "discounted" phone was actually full-price, spread out across 24 monthly bills so as to be less conspicuous. Wireless Co X did not clearly disclose upfront that it would amortize the rack-rate price of the phone in this way. To the contrary, it implied that I was getting a discount."

According to another embodiment, the second part of the NOD concerns the law. In (1) certain embodiments, this second part is a static, citation-driven summary of causes of action that a consumer may bring against his service provider. In (2) certain other embodiments, this second part may be dynamic, driven by a rule-based mapping of generic factual patterns to causes of action. For instance, such a mapping can generically map a problem of "slow internet" (i.e., internet slower than advertised) to a cause of action for "false advertising." In either event, this second part of the NOD is in certain embodiments customized to the user's jurisdiction and/or the provider's industry.

In further embodiments, the third part of the NOD, the user's request, begins with a legal background regarding the dispute and any topics including (1) contractual provisions limiting liability and damages, (2) doctrines limiting consumers' ability to recover damages, and (3) other generally related consumer protection law. This third part of the NOD can be customized to the user's jurisdiction, the service provider's industry, the service provider's location, and/or the location of the performance of the service.

In one example, the third part shows all completed calculations of what the user is requesting to have refunded, reimbursed or compensated. The third part of the communication object (e.g., letter or NOD letter) tallies the calculations and provides a total request.

In further examples, the third part concludes with a manifestation of the user's electronic signature. In embodiments permitting the user to upload documentation, the documentation can be attached physically or electronically, such as by way of an appendix or a URL of a website hosting the documentation.

In certain embodiments, the system is configured to allow the user to review and edit the NOD, for example, in a rich-text editor at 246. Once satisfied, the user electronically signs the communication object (e.g., the letter, or the more specifically a NOD letter). In some embodiments, the user may state whether or not she wants to submit a complaint with one or more applicable government regulators.

The system is also configured to capture payment information according to use of the system. In one example, the user pays using a credit card 248. In certain embodiments, the user pays a flat fee. In other embodiments, the user pays a fee equal to a flat percentage of a refund request or of the money actually received from the provider or in further examples, an eventual court or arbitrator.

According to some implementations, the system is configured to send 250 a hard copy and/or an electronic copy of the communication object (e.g., the generated form letter) to the provider. In certain embodiments, the letter is sent according to the delivery channel specified by the provider for such letters, e.g., U.S.P.S. Certified Mail. An electronic copy of the communication object is stored on the system and each respective object is available to its user in his account.

If the user requested 252 that a complaint be filed with one or more government regulators, the system completes the applicable submission(s) on the user's behalf 254. In order to accomplish the submissions, the system contains a mapping from the fields in the user survey to the closest-corresponding fields in the complaint template of the regulator(s). In some implementations, the system translates data from the template fields into the fields provided by the regulatory agency's web-based forms.

In another embodiment, the system automates tracking of delivery at 256. For example, the system can track any communication object generated and communicated (e.g., a mailed NOD) to the provider. In one example, the system implements APIs to communicate with third party providers to capture delivery information. The system can then update the user's online account upon delivery.

In certain embodiments, for certain providers, the provider's contract with consumers obligates the customer to report a problem within a period of time and can further limit the provider to a fixed period of time (frequently 30 days) within which to reply to the user's letter. In some instances, the provider's reply will include a pecuniary offer to resolve the dispute. In some instances, the provider's dispute resolution agreements specify additional payments to the user based on rejection of a proposed settlement offer and later victory at arbitration. For example, if the user rejects the offer but later wins more than the offered amount in arbitration, the user is contractually entitled to a bonus payment (for instance, $5,000 or $10,000). Thus, these providers respond to the user's letter in the shadow of these bonus payments.

Additionally, for certain complaints to regulators, statutory requirements may impose time-based obligations on a provider to respond to the consumer within a fixed period of time (in the case of telecommunications providers, 30 days), copying the regulator on the response. Anecdotal evidence suggests that this requirement may have a salubrious influence on the provider's responsiveness to consumer concerns.

In certain embodiments, the system identifies an applicable time period automatically. In one example, the system is configured to notify the user at 258 once an applicable time period has expired. In some embodiments, the system is configured to communicate a request to the user to update his account at the end of such time periods. In other examples, the system can periodically request updates on any or key developments 260 in the resolution of the dispute. The development may include any offer made by the provider and any acceptance thereof.

In some embodiments, the system is configured to correlate outcome information (e.g., offers, offer amounts, acceptances, rebates, contact cancellation, and so forth) with independent variables (e.g., which problems are displayed, which problems are selected, the user's location, the provider, the provider's location, and so forth) that allow the system to automatically fine-tune outcome models at 262 to provide increased accuracy and predictability while reducing execution burden based on evolving outcome models.

In some embodiments, further analysis by the system and/or system administrators allows less constrained optimization. The richness of the factors incorporated into this modelling component/engine is reflected, for example, in the selected factors listed in FIG. 5.

FIG. 6 is a block diagram of an example dispute management system 600. System 600 can be implemented with one or more system components (e.g., 610-618) and/or implemented via a resolution engine 604 configured to accept user input 602 (e.g., dispute information, free text, uploaded files, uploaded e-mail, business account information, etc.), identify a user problem or dispute from the input 602, identify a template for a dispute communication to a provider, and generate a communication object 606 (e.g., a letter) to the provider including at least part of the user input 602 and template information describing the user's dispute and potential outcome for the provider if a resolution is not reached.

According to some embodiments, the operations and/or functions discussed herein can be implemented in a resolution engine 604. The resolution engine 604 can instantiate various system components to performed specialized functions to process user input 602 and generate a communication object 606 describing the user's problem, a request for resolution, and support for the user's request. In other embodiments, the resolution engine can execute the function alone, and no further components are necessary.

In one implementation, the engine 604 includes generation component 610 configured to select a template associated with a business identified in user responses to dispute information requests. Various templates for resolving disputes can be stored in databases (e.g., 608) associated with the dispute management system. Individual templates can be customized to a specific provider, particular requirements specified by the provider, general industries, product lines, etc. The generation component 610 is configured to select a template responsive to user input describing a problem and/or provider.

In some embodiments, the system 600 and/or engine 604 can include a user interface component 612. The user interface component is configured to solicit and/or facilitate entry of information necessary to select a template for resolving a dispute. Further, the interface component 612 can be configured to solicit information from the user necessary to complete template fields in the template.

Depending on the input received, the system and/or engine 604 can include a transformation component 614 configured to transform user input received in response to the dispute information requests into template field entries. In one example, the transformation component is configured to identify and execute transformation rules on the user input responsive to the identified business or identified dispute to generate the template field entries. In another embodiment, the transformation component is configured to receive input from the user interface and input that information into associated template fields.

Once an interactive session with the user is complete (i.e., input for all necessary template fields has been supplied) the generation component can generate a communication object 606 (e.g., a dispute letter). The communication object can be created to follow any provider-specified and/or rule-based communication requirements stored on the system (e.g., database 608).

In some examples, the system and/or engine 604 can include a communication component 616 configured to analyze the user input received in response to the dispute information requests to determine communication requirements for the dispute communication object. In some embodiments, the communication component can be a subcomponent of the generation component 610. In one embodiment, the communication component is further configured to generate a physical letter responsive to the communication requirements, including physical mailing requirements. In other embodiments, the communication component is configured to identify a class of dispute based on analysis of the user input that includes, for instance, an unfair or deceptive business practices complaint, and generates a physical letter responsive to generally applicable law.

In some examples, either the generation component or the communication component can identify the applicable consumer protection law requirement responsive to analyzing the user input received and identifying one of or combinations of a user location, a dispute location, or a business location.

According to further embodiments, the user interface component is configured to capture information via displays of one or more questionnaires to the user. The user interface component interactively selects questions to present to the user in the questionnaire, and the selected questions include at least a request for identification of a business provider. The selected questions can also include request for or suggestion of common problems that describe the user's dispute. The user interface component can dynamically select or refine suggested categories and/or questions displayed responsive to matching user input to dispute information requests.

According to one embodiment, the system and/or engine can also include a modelling component 618. The modelling component can be configured to model dispute information and enable association of dispute facts to a resolution template. In further embodiments, the modelling component is further configured to model outcomes with any one or more, or any combination of dispute facts, templates, business, dispute category, user, etc. to allow the system to refine any one or more, or any combination of suggested questions, suggested category, suggested template and suggested value for the dispute.

In further embodiments, the system and/or engine can also include a valuation component. The valuation component can be configured to generate a valuation of a user problem responsive to user input. In some embodiments, the valuation can be based on the value of the service, a length of time associated with the disruption, etc. In some embodiments, the valuation component can determine the valuation based on likelihood of a positive resolution (e.g., the valuation component can use information on specific providers to determine a hypothetical value statistically likely to be paid by the provider). In further embodiments, the valuation component can generate a resolution value range and assign relative probabilities to values within the range. The system can then allow the user to select a value and a degree of risk they are willing to accept. In other implementations, the valuation component can be configured to use provider behavior to modify valuations. For example, a provider who tends to offer 50% of a request can have its valuations adjusted accordingly. Other behavioral characteristics can be determined from the data and feedback loop executed by the system. Any of the behavioral characteristics can be used by the system to refine dispute valuations. In the preceding example, system executed analysis of the provider may determine, for instance, that the provider offers 50% of a request, where the offer of 50% is insensitive to the particular reasoning, facts, etc. The system is configured to modify the provider's templates to increase the request amount, in response to such an evaluation. The system can focus evaluations based on problem categories and make determinations on provider behavior. The behavior model generated by the system for each provider and/or each problem category and provider can then be used by the system to automatically modify associated templates and request values.

Example User Interfaces

Figure 9:
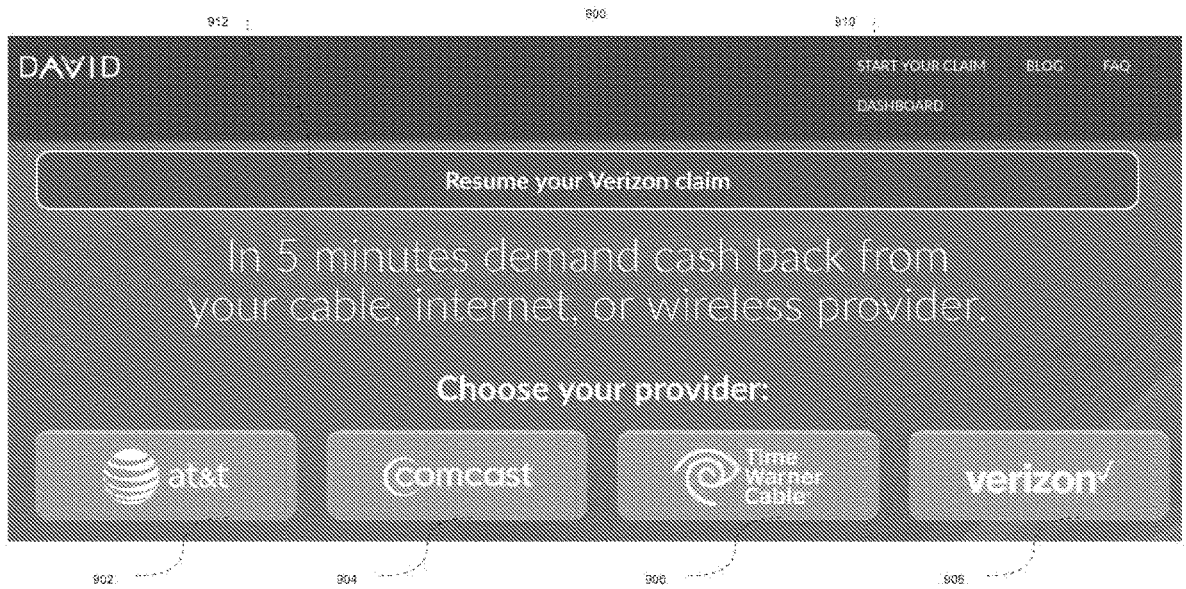
FIG. 9 is an example user interface according to one embodiment.
Figure 11B:
Figure 11D:

FIGS. 9-13 illustrate screen captures of example user interfaces provided by a dispute system. FIG. 9 is an opening screen 900 that is configured to provide users a streamlined approach to creating a trackable communication object with simple and straightforward selections in the UI, which trigger operations to match a consumer issue to known problems and/or templates based on large volumes or prior requests and track results associated with those requests.

In some embodiments, the dispute system can target to specific providers, as well as providing for free text entry of any provider. In FIG. 9, the dispute system displays tailored UIs, where the system is tailored to facilitate telecom disputes. Screen 900 displays provider selection options at 902-908 (e.g., AT&T 902, COMCAST 904, TIME WARNER 906, and VERIZON 908). If a user is returning, the user is provided the option to login at 910 to access prior disputes, update dispute information, check on dispute resolution, etc. In further embodiments, the system can be configured to track prior inputs even from anonymous users. In one example, any prior dispute information can be recorded as a cookie on a user's computer. When the user accesses the UI (e.g., screen 900), the cookie information is captured and used in crafting a dispute communication object, for example, through a progression through the UIs shown in FIGS. 9-13. In one embodiment, the system can determine that dispute information has been entered, but not completed, and the screen 900 can display an indication 912 of a type of claim associated with an executable to return the user to a prior data entry point (i.e., where a user left off in the progression of screens shown in FIGS. 9-13). Responsive to selection of 912 the user is directed to whatever UI contained the user's last data entry.

Responsive to selection of any provider (e.g., 902-908), the system is configured to retrieve template information associated with the selected provider (e.g., via a query against the selected provider on stored template information). In some embodiments, the next user interface shown to the user is dynamically generated based on responsive information contained in stored templates. For example, categories of problem types can be returned for a given provider and those categories used to dynamically build frames in the UI next shown to the user, where the ordering of the displayed categories can be determined based on likelihood of an issue associated with a given provider. For example, phone problems may be the most reported problems for VERIZON, and thus first UI portion can display options for common phone problems. The system may determine TV/Internet problems is the next most frequently occurring and display a second portion of the UI for inputting common TV/Internet problems. In some embodiments, problem category displays can be dynamically ordered by the system (e.g., based on relative frequency) and shown in respective UIs. In other embodiments, categories and problems within each category can be ordered (e.g., based on frequency analysis) by the system dynamically in the UI.

For example, FIGS. 10A-B show pages of a user interface 1000 that can be accessed via a conventional browser (e.g., FIREFOX, INTERNET EXPLORER, CHROME, etc.). UI 1000 includes a first portion 1002 of the UI that displays a first problem category associated with the user's prior selection of a provider (e.g., VERIZON). In some embodiments, the first portion can be displayed as a frame, outlined box, discrete portion of the UI, etc. In various embodiments, only the most common problems in retrieved categories associated with the selected provider are shown in the UI to enable the user to quick and easily process relevant information. For example, based on retrieved problem categories associated with VERIZON, UI 1000 display a first category in a first portion of the UI 1002, a second category in a second portion of the UI 1004, a third category in a third portion of the UI 1008, and a fourth category in a fourth portion of the UI 1010. As discussed above the problem categories displayed in each portion can be dynamically ordered by the system for display in any user interface. Thus, the ordering can change over time, for example, responsive to tracked user submissions and problem reporting (which can include publically available information captured by the system). Further, the UI screen shown can be dependent on the number of problems associated with a given provider. As problem tracking by the system continues over time, new common problems can be associated with the provider and integrated into the UI. In one example, the system monitors a frequency threshold associated with tracked problems, and upon exceeding the frequency threshold elevates problem category so that it will be displayed in the UI for resolution.

Template language can be generated from tracked problems automatically, as well as drop downs that focus the user on identifying a value that can be assigned to the particular problem.

According to another embodiment, each problem category (e.g., shown in 1000) can be associated with a display threshold so that only common problem categories are shown in the UI. In further embodiments, each problem category may also be associated with a problem display threshold, such that within each problem category, only the most common problems are displayed for visual selection, absent further actions by the user. Limiting the display of problems to the most common problems within each category improves the system's ability to query for user input across a broader range of issues, and simplifies user selection. According to another aspect, limiting interface displays to the most common problems, limits the volume of information that the system needs to render across a multitude of submitted problems. Over time the savings in computation and CPU usage, memory resources, and display operations provides significant advantage over conventional implementation (e.g., in terms of CPU cycles used, memory usage, and display operations). Shown at 1010, 1012, 1014, and 1016 are titles for each problem category. With each category is shown a visual selection (e.g., 1036) and label for a specific problem in each category (e.g., at 1018-1036). According to one embodiment, each individual problem is associated with a visual selector (e.g., 1036 and 1018) in the UI. Responsive to selection of the visual selector (e.g., 1036) the system retrieves template information associated with the provider and template language for describing the associated problem. Further upon selecting a submit control in the UI (e.g., 1040 "Next") the system is configured to advance to a third UI (for example, as discussed in greater detail below with respect to FIG. 12). In some embodiments, the templates for each problem include one or more fields configured to accept user input, to facilitate user selections to assign a value to any selected problem.

According to one embodiment, each selection by a user in the second UI 1000 is additive in terms of retrieved templates, and results in dynamic creation of a third UI and associated screens based on user selection, which can cover any number of problems, over any number of problem categories.

In the event that the user has additional issues or the common problems listed in each category are not sufficient, each portion of the UI associated with a problem category (e.g., 1002-1008) includes an expansion operator (e.g., 1038). The expansion operator is configured to trigger the system to render additional problems (and associated visual selectors for each additional problem) responsive to selection in the UI (e.g., 1000). In one example, responsive to selection of 1038 the UI is configured to transition to the view shown in FIG. 11A, UI 1100. The listing of common problems shown in UI 1100 displays "Broken" at 1102, "Not Delivered" at 1104, "Faulty software" at 1106, and "Faulty landline service" at 1108. As discussed above, the additional problems can be ordered based on dynamically determined problem frequency. In further embodiments, ordering can also be influenced by public information sources that identify problems with specific providers (e.g., news reports on internet outages for Verizon, recalled phones, misleading advertising, etc.).

In some embodiments, the system can include an API configured to search on provider issues and create new problems and/or problem categories responsive to identified issues. In some embodiments, the API can include a classifier for identifying a problem category and specific problem (e.g., by extracting terms from published articles, etc.). In further embodiments, the system created problem can be paired with a system created template (e.g., selected by the system based on similarity to existing templates). In yet other embodiments, the system created problems can be given artificial frequency numbers to elevate their ordering in a respective list of problems.

As discussed above, each problem is associated with a visual selector in UI 1100 (e.g., at 1110-1116). The visual selectors are configured to set a state for the system, such that in response to selection of Next at 1120 the system captures templates associated with each selected problem and current provider. Each portion of the UI can be expanded via selection of a respective expansion operator (e.g., 1004, 1006, and 1008) (except is some examples where only a few problems, or one or two problems, exist in a problem category). FIGS. 11A-D show each UI portion in an expanded state. Each expansion operator can also be configured to return a respective UI portion to a contracted view in response to further selection in the UI.

FIG. 12 illustrates another UI 1200. UI 1200 is configured to display problem templates associated with a current provider, responsive to state selections (e.g., via visual selectors 1036, 1110-1116) in a previous UI display. Each problem template is configured to display the problem template as at least a portion of a narrative, wherein the portion of the narrative is incorporated into an electronic communication created via the progression of user interface screens and input requests. For example, the system can retrieve a template associated with faulty coverage and display a narrative associated with the retrieved template with problem element 1202 in UI 1200. In some embodiments, the retrieved template includes one or more user input portions to enable a user to tailor their dispute (and ultimately a final communication object for delivery to the provider). At 1204 a first user input portion is displayed to elicit valuation information associated with the user's problem. In some embodiments, the template is configured to elicit a payment amount (e.g., at 1204) and a period of time associated with the problem (e.g., at 1206). Various templates can also include a drop down selector (e.g., 1208) to elicit a quantification or approximation associated with the user's problem. In one example, selector 1208 is configured to display a drop down selector of percentages (e.g., 10, 15, 20, 25, 30, 35, 40, 45, 50, 55, 60, 65, 70, etc.). Various templates include fields for user input of specific amounts, time periods, and percentage outage for problems that have affected the service. Other template examples include fields for direct user input on a values associated with their problem and may also include a reason for the value.

As shown in UI 1200, state selections in prior user interfaces (e.g., UI 1100 or UI 1000) control what template selections are made by the system and the corresponding UI elements shown for user input in 1200. Included in each UI element (e.g., 1202) shown is a control to delete or eliminate a template selection made in a prior screen (e.g., at 1210). Responsive to selection of 1210, the system eliminates the UI element and proceeds to generate a communication object for the user with any remaining elements. In one example, deletion of all the UI elements shown in 1200, triggers the system to return to a prior screen for identification of problems the user wishes to specify (e.g., triggers return to screen 1000 or 1100). At 1212 shown is another UI element associated with a prior identified problem "TV/Internet—Slow internet." Similar to 1202, the user is requested to provide inputs (e.g., at 1214, 1216, and 1218)

to control system determination of a value associated with the problem. At 1220 shown is another UI element where the user is requested to enter inputs (e.g., at 1222 and 1124) to control system determination of a value associated with the problem and/or to complete a narrative description of the problem. Selection of 1226 or 1228 is configured to remove the respective UI element. Once the user has entered the requested information, the user may select "NEXT" at 1230 to advance to a complete screen.

Figure 13:
FIG. 13 is an example user interface according to one embodiment.

Shown in FIG. 13 is a completion screen 1300. Screen 1300 is configured to finalize a communication object for transmission to the specified provider (e.g., e-mail, physical letter, or both, etc.). In some embodiments, UI 1300 includes API tie-ins to various social media or other "single sign-on" accounts, which enable the user to provide authentication information for their respective social media account as a means to login and obtain status information on their dispute (e.g., by selecting 1302). If the user is not the actual account holder with a given provider additional information can be collected through UI 1300 at 1304. Responsive to selection of 1304, additional entry displays will be shown to collect information on the account holder (e.g., name, account number, etc.). In some embodiments, provider-specific executables and/or APIs are triggered by the system to validate provider account information (e.g., responsive to selection of 1306). Once identifying information has been entered and/or validated, the user can select "Submit" at 1310. Responsive to selection of the submit control at 1310, the system is configured to validate user-entered information (e.g., for completeness) and finalize a communication object including narrative description of the user's issue, valuation information developed via user interface entries, and a request directed to the provider for redress. In further embodiments, the communication object is sent in response to selection of 1310 and/or validation. Additional screens can be presented indicating that a dispute communication was sent and providing reference information to the user. Further options can be displayed to enable the user to transmit the communication object to regulatory agencies responsible for overseeing such disputes. With a single click the user can identify an agency, and the system can communicate the dispute communication to the regulatory agency. In some embodiments, the system retrieves user entered information, narrative information, etc., entered in prior screens and tailors a new communication object for the regulatory agency. For example, tracking information can also be collected by the system on each regulatory submission, and the system can tailor narratives, organization, and/or valuations based on prior submissions and results.

According to one embodiment, the system includes a modelling component configured to capture, for example, key words from prior dispute information, and associate those key words and/or valuation information with tracked results. The modelling component can be further configured to build models associated with successful requests and modify existing templates to include common keywords found in disputes having positive results (e.g., payment of at least a portion of dispute request). In yet other examples, the modelling component can be configured to search disputes that do not have positive outcomes for key words and/or valuations and associate those keywords with negative models. The system can be configured to modify existing templates to exclude common keywords found in disputes having negative results.

In further examples, the modelling component can be configured to build models that are based on an amount of a request (in some examples the model may take into account the value and a period of time) and a tracked outcome. Responsive to determining a valuation for a dispute from user inputs, the system can analyze modelled valuations and results to determine if the valuation is likely to result in a positive outcome. In some embodiments, likelihood can be determined for a valuation within a problem category and/or based on a specific problem and/or for a specific provider so that the system can suggest changes in a particular valuation with a greater likelihood of a positive result. In one example, likelihood can be based on frequency of positive outcomes based on matching dispute information and valuation. In another example, likelihood can be determined based on similar dispute information and valuation for a provider. In yet another example, likelihood can be analyzed across providers.

The modelling component can also be configured to generate trends from prior disputes and tracking information, and the trends used to direct user-specified problems into areas that are associated with positive outcomes.

Figure 8:
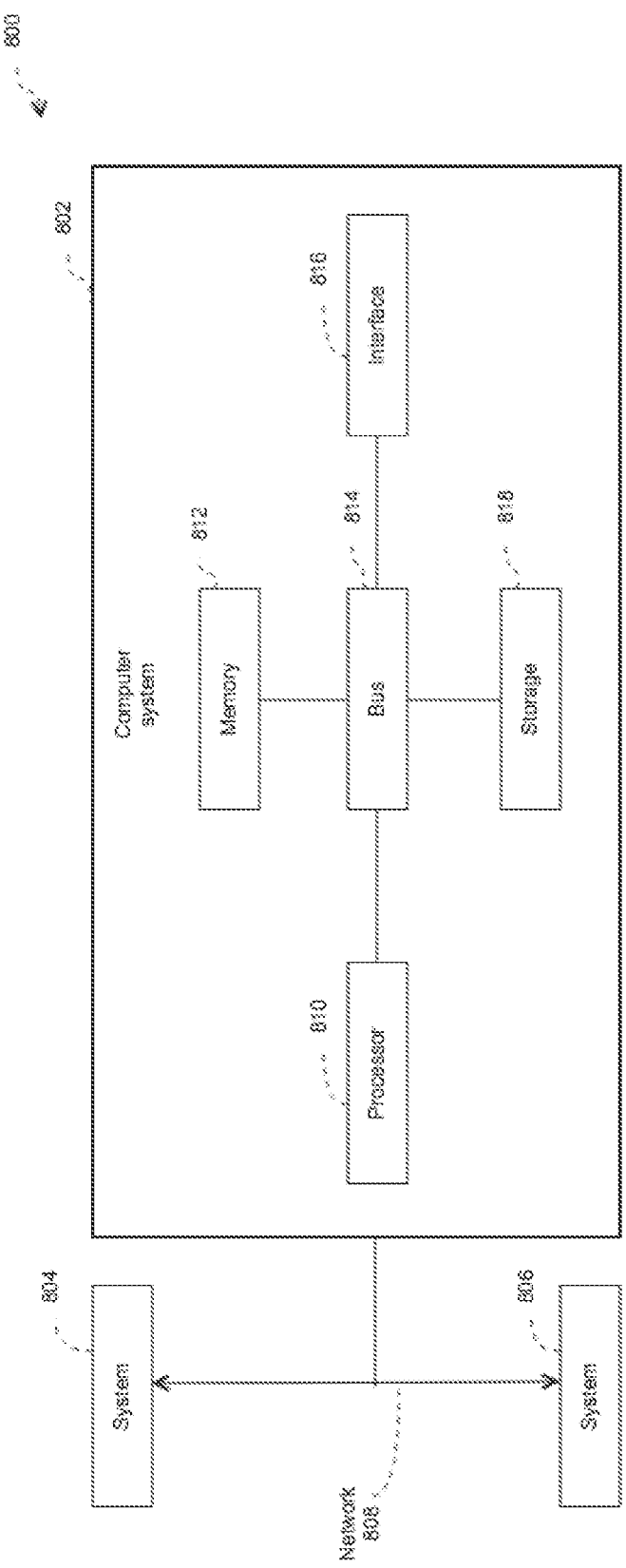
FIG. 8 is a block diagram of an example computer system according to one embodiment.

Referring now to FIG. 8, there is illustrated a block diagram of a special purpose distributed computer system 800, in which various aspects and functions are practiced. As shown, the distributed computer system 800 includes one or more special purpose computer systems that exchange information. More specifically, the distributed computer system 800 includes specially configured computer systems 802, 804 and 806. As shown, the computer systems 802, 804 and 806 are interconnected by, and may exchange data through, a communication network 808. For example, system engines, system components, subsystems, and/or modules can be implemented on 802, which can communicate with other systems (804-806), which operate together to provide the functions and operations as discussed herein.

In some embodiments, the network 808 may include any communication network through which computer systems may exchange data. To exchange data using the network 808, the computer systems 802, 804 and 806 and the network 808 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SSB, JSON, SOAP, CORBA, REST and Web Services. To ensure data transfer is secure, the computer systems 802, 804 and 806 may transmit data via the network 808 using a variety of security measures including, for example, TLS, SSL or VPN. While the distributed computer system 800 illustrates three networked computer systems, the distributed computer system 800 is not so limited and may include any number of computer systems and computing devices, networked using any medium and communication protocol.

As illustrated in FIG. 8, the computer system 802 includes at least one processor 810, a memory 812, a bus 814, an interface 816 and data storage 818. To implement at least some of the aspects, functions and processes disclosed herein, the processor 810 performs a series of instructions that result in manipulated data. The processor 810 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 810 is connected to other system components, including one or more memory devices 812, by the bus 814.

The memory 812 stores programs and data during operation of the computer system 802. Thus, the memory 812 may be a relatively high performance, volatile, random access memory such as a dynamic random access memory (DRAM) or static memory (SRAM). However, the memory 812 may include any device for storing data, such as a disk drive or other non-volatile storage device. Various examples may organize the memory 812 into particularized and, in some cases, unique structures to perform the functions disclosed herein. These data structures may be sized and organized to store values for particular data and types of data.

Elements of the computer system 802 are coupled by an interconnection element such as the bus 814. The bus 814 may include one or more physical busses, for example, busses between components that are integrated within the same machine, but may include any communication coupling between system elements including specialized or standard computing bus technologies such as IDE, SCSI, PCI and InfiniBand. The bus 814 enables communications, such as data and instructions, to be exchanged between system components of the computer system 802.

The computer system 802 also includes one or more interface devices 816 such as input devices, output devices and combination input/output devices. Interface devices may receive input or provide output. More particularly, output devices may render information for external presentation. Input devices may accept information from external sources. Examples of interface devices include keyboards, mouse devices, trackpads, microphones, touch screens, printing devices, display screens, speakers, network interface cards, etc. Interface devices allow the computer system 802 to exchange information and to communicate with external entities, such as users and other systems.

The data storage 818 includes a computer readable and writeable nonvolatile, or non-transitory, data storage medium in which instructions are stored that define a program or other object that is executed by the processor 810. The data storage 818 also may include information that is recorded, on or in, the medium, and that is processed by the processor 810 during execution of the program. More specifically, the information may be stored in one or more data structures specifically configured to conserve storage space or increase data exchange performance.

The instructions stored in the data storage may be persistently stored as encoded signals, and the instructions may cause the processor 810 to perform any of the functions described herein. The medium may be, for example, optical disk, magnetic disk or flash memory, among other options. In operation, the processor 810 or some other controller causes data to be read from the nonvolatile recording medium into another memory, such as the memory 812, that allows for faster access to the information by the processor 810 than does the storage medium included in the data storage 818. The memory may be located in the data storage 818 or in the memory 812; however, the processor 810 manipulates the data within the memory, and then copies the data to the storage medium associated with the data storage 818 after processing is completed. A variety of components may manage data movement between the storage medium and other memory elements and examples are not limited to particular data management components. Further, examples are not limited to a particular memory system or data storage system.

Although the computer system 802 is shown by way of example as one type of computer system upon which various aspects and functions may be practiced, aspects and functions are not limited to being implemented on the computer system 802 as shown in FIG. 8. Various aspects and functions may be practiced on one or more computers having different architectures or components from those shown in FIG. 8. For instance, the computer system 802 may include specially programmed, special-purpose hardware, such as an application-specific integrated circuit (ASIC) tailored to perform a particular operation disclosed herein, while another example may perform the same function using a grid of several specially configured computing devices running MAC OS System X with Motorola PowerPC processors and several specialized computing devices running proprietary hardware and operating systems.

The computer system 802 may be a computer system including an operating system that manages at least a portion of the hardware elements included in the computer system 802. In some examples, a processor or controller, such as the processor 810, executes an operating system. Examples of a particular operating system that may be executed include a Windows-based operating system, such as Windows NT, Windows 2000 (Windows ME), Windows XP, Windows Vista, or Windows 7 or 8, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and examples are not limited to any particular operating system.

The processor 810 and operating system together define a computer platform for which application programs in high-level programming languages are written. These component applications may be executable, intermediate, bytecode or interpreted code that communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Objective C, or Javascript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or data objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Academics, policymakers and consumers themselves have long bemoaned the disadvantage that consumers suffer as unsophisticated, one-shot players in their interactions with large businesses. According to some aspects, the system's perpetually refining data model presents an unprecedented opportunity to help level the playing field. Satisfied users can be invited to endorse the software/system on social media. In certain embodiments, a money-back guarantee is available to users who fail to receive a refund from their service above a particular threshold—such as the purchase price of the software.

According to another aspect, the system provides tools to help consumers level the playing field between the pro se consumer and the behemoth she does business with. In some embodiments, the tools can be used by the consumer for (1) identifying misconduct in the first place, (2) seeking informal redress from the business, and (3) commencing and (4) prosecuting a civil action or ADR proceeding against the business.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A system comprising:
   at least one processor operatively connected to a memory, the at least one processor when running is configured to execute a plurality of system components, wherein the plurality of system components comprise:
   an interactive user interface component configured to:
     display dispute information requests;
     display generation of a dispute communication in association with entry of responses to the dispute information requests;
   a generation component configured to select at least one template associated with a business identified in user responses to the dispute information requests; and
   a transformation component configured to transform user input received in response to the dispute information requests into template field entries, the transformation component further configured to identify and execute transformation rules on the user input responsive to the identified business or an identified dispute to generate the template field entries, wherein the transformation component is configured to:
     map a first user input field into a first template field, wherein the first user input field specifies a problem type associated with the dispute;
     map a second user input field into a second template field, wherein the second user input field specifies a problem classified within the problem type;
   wherein the generation component is further configured to:
     generate a dispute communication object from the selected template and the template field entries;
     generate the dispute communication object to include electronic messaging fields associated with an electronic messaging application; and
   trigger communication of the communication object to the business identified in the user responses.

2. The system according to claim 1, wherein the plurality of system components further comprises a communication component configured to analyze the user input received in response to the dispute information requests to determine communication requirements for the dispute communication object.

3. The system according to claim 2, wherein the communication component is further configured to generate a physical letter responsive to determining that the communication requirements specify physical mailing.

4. The system according to claim 3, wherein the communication component identifies a class of dispute based on analysis of the user input that includes an unfair or deceptive business practices complaint, and generates the physical letter responsive to determining that the communication requirements derived from generally applicable law and/or contract provisions.

5. The system according to claim 4, wherein the communication component is configured to identify the applicable requirement responsive to analyzing the user input received to identify one of or combinations of a user location, a dispute location, or a business location.

6. The system according to claim 5, wherein the communication component is configured to capture communication requirements for each match on the user location, dispute location, or the business location and select a merged set of requirements.

7. The system according to claim 1, wherein the interactive user interface component is configured to display suggested categories associated with common problems that describe the user's dispute.

8. The system according to claim 1, wherein the interactive user interface component dynamically selects or refines suggested categories displayed responsive to matching user input to the dispute information requests.

9. The system according to claim 1, wherein the generation component generates the dispute communication object as at least an electronic letter to the identified business.

10. The system according to claim 9, wherein the generation component validates that the electronic letter meets the requirements specified by the identified business for particular types of correspondence solicited from the consumer by the business; and wherein the generation component is further configured to validate the electronic letter against prior issues tracked for the business and any resolution associated with the prior issues.

11. The system according to claim 2, wherein the communication component includes at least one application programming interface (API) configured to access online tracking services of the postal delivery service and validate delivery.

12. The system according to claim 2, wherein the communication interface is configured to execute a tracking application programming interface (API) configured to: access an online tracking service; input tracking information associated with the dispute communication object; and capture status information.

13. The system according to claim 1, further comprising a tracking component configured to:
   capture any responsive information received on a dispute request;
   associate the responsive information with an indication of positive or negative outcome.

14. The system according to claim 13, further comprising a modelling component configured to:
   extract keywords from the responsive information and associate the keywords with the outcome.

15. The system of claim 13, wherein the modelling component is configured to:
   automatically execute analysis of outcome or success metrics, and generate models of dispute behavior or models of dispute outcomes.

16. The system of claim 15, wherein the modelling component analyzes a current user's dispute information, matches the dispute information to a communication model or outcome model.

17. The system of claim 16, wherein the modelling component identifies outcomes and models each outcome as a function of independent factors.

18. The system of claim 17, wherein the modelling component dynamically selects or refines template formats responsive to modelling outcomes on historic data.

19. The system of claim 1, wherein the interactive user interface component is further configured to generate:
   a first display configured to request user input of a provider associated with a user dispute, wherein the first display includes a plurality of visual selection objects, each respective object associated with a specific provider;
   a second display configured to request user specification of a problem associated with the provider identified in the first display, wherein the second display includes a plurality of problem selection objects organized by problem category;
   the plurality of problem selection objects configured to store a state responsive to user selection;
   a third display configured to:
      tailor a display of user input elements responsive to the selection state stored in a prior display, wherein the displayed user input elements are configured to accept user specification of valuation information; and
      trigger calculation of a dispute value associated with the user's dispute; and
   a fourth display configured to:
      accept user input of account identifying information with the selected provider; and
      trigger communication of a dispute communication object to the selected provider.

20. A system comprising:
   at least one processor operatively connected to a memory, the at least one processor when running is configured to execute a plurality of system components, wherein the plurality of system components comprise:
   an interactive user interface component configured to:
      display dispute information requests;
      display generation of a dispute communication in association with entry of responses to the dispute information requests;
   a generation component configured to select at least one template associated with a business identified in user responses to the dispute information requests; and
   a transformation component configured to transform user input received in response to the dispute information requests into template field entries, the transformation component further configured to identify and execute transformation rules on the user input responsive to the identified business or an identified dispute to generate the template field entries, wherein the transformation component is configured to execute a first application programming interface (API) configured to:
   map a first user input field into a first template field, wherein the first user input field specifies a problem type associated with the dispute;
   map a second user input field into a second template field, wherein the second user input field specifies a problem classified within the problem type;
   wherein the generation component is further configured to generate a dispute communication object from the selected template and the template field entries and output the dispute communication object, wherein the generation component is further configured to execute a second API to generate the dispute communication object, wherein
   the second API is configured to:
      generate the dispute communication object to include electronic messaging fields For an electronic messaging application; and
   trigger communication of the communication object to the business identified in the user responses.

* * * * *